(12) United States Patent
Tsai et al.

(10) Patent No.: US 9,042,294 B2
(45) Date of Patent: May 26, 2015

(54) SYSTEM AND METHOD FOR RELAYING TRANSMISSIONS IN WIRELESS COMMUNICATIONS

(75) Inventors: Shiau-He Tsai, San Diego, CA (US); Yunsong Yang, San Diego, CA (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 889 days.

(21) Appl. No.: 12/717,009

(22) Filed: Mar. 3, 2010

(65) Prior Publication Data

US 2011/0080865 A1  Apr. 7, 2011

Related U.S. Application Data

(60) Provisional application No. 61/248,520, filed on Oct. 5, 2009.

(51) Int. Cl.
| | |
|---|---|
| *H04B 7/14* | (2006.01) |
| *H04J 1/10* | (2006.01) |
| *H04J 3/08* | (2006.01) |
| *H04B 7/155* | (2006.01) |

(52) U.S. Cl.
CPC .................................. *H04B 7/1555* (2013.01)

(58) Field of Classification Search
CPC .. H04B 7/15557; H04B 7/1555; H04B 7/026; H04B 7/15507; H04B 7/15528; H04B 7/15542; H04B 7/40; H04B 10/29
USPC ......... 370/315, 492, 501, 274, 279, 293, 428; 455/7, 11.1, 13.1, 16
See application file for complete search history.

(56) References Cited

U.S. PATENT DOCUMENTS

| | | | |
|---|---|---|---|
| 8,218,510 B2 * | 7/2012 | Kim et al. | 370/337 |
| 2007/0190934 A1 * | 8/2007 | Kim et al. | 455/7 |
| 2008/0137581 A1 * | 6/2008 | Doppler et al. | 370/315 |
| 2008/0274692 A1 * | 11/2008 | Larsson | 455/24 |
| 2010/0067427 A1 * | 3/2010 | Choudhury | 370/315 |
| 2010/0067429 A1 * | 3/2010 | Tsuruoka et al. | 370/315 |

(Continued)

FOREIGN PATENT DOCUMENTS

| | | |
|---|---|---|
| WO | WO 2007/108299 A1 | 9/2007 |
| WO | WO 2008/049028 A1 | 4/2008 |
| WO | WO 2008/057388 A1 | 5/2008 |

OTHER PUBLICATIONS

Alcatel-Lucent, et al., "Way Forward on Type II Relay," R1-092264, May 2009, 3 pages.

(Continued)

*Primary Examiner* — Hoang-Chuong Vu
(74) *Attorney, Agent, or Firm* — Slater & Matsil, L.L.P.

(57) ABSTRACT

A system and method for relaying transmissions in wireless communications is provided. A method for combined relay node operation includes determining an operating mode of the combined relay node, where the combined relay node includes a repeater and a relay. The method also includes if the operating mode is repeater on mode, amplifying and forwarding received signals, and storing subframes, where subframes are demodulated and decoded versions of the received signals. The method further includes if the operating mode is repeater off mode, amplifying and forwarding a control zone of signals received while the operating mode is repeater off mode, and transmitting subframes stored while the operating mode is repeater on mode.

17 Claims, 18 Drawing Sheets

(56) References Cited

U.S. PATENT DOCUMENTS

| | | | | |
|---|---|---|---|---|
| 2010/0110966 A1* | 5/2010 | Palanki et al. | | 370/315 |
| 2011/0026429 A1* | 2/2011 | Slimane et al. | | 370/252 |
| 2011/0064019 A1* | 3/2011 | Chun et al. | | 370/315 |
| 2011/0092154 A1* | 4/2011 | Horiuchi et al. | | 455/7 |
| 2011/0142013 A1* | 6/2011 | Manssour et al. | | 370/336 |
| 2011/0176585 A1* | 7/2011 | Seo et al. | | 375/211 |
| 2011/0222428 A1* | 9/2011 | Charbit et al. | | 370/252 |
| 2011/0269395 A1* | 11/2011 | Larsson et al. | | 455/7 |
| 2012/0009867 A1* | 1/2012 | Hwang et al. | | 455/7 |
| 2012/0093061 A1* | 4/2012 | Charbit et al. | | 370/315 |

OTHER PUBLICATIONS

"Patent Cooperation Treaty Search Report and Written Opinion," International Application No. PCT/CN2010/071085, Applicant: Huawei Technologies Co., Ltd., et al., mailing date: Jul. 8, 2010, 14 pages.

LTE; Evolved Universal Terrestrial Radio Access (E-UTRA); Physical Channels and Modulation (3GPP TS 36.211 v8.7.0 Release 8), ETSI TS 136 211, Jun. 2009, 87 pages.

* cited by examiner $y_1 = (h_1 + h_2 \cdot h_3) \cdot x$ $\hat{y}_1 = (h_1 + \hat{h}_2 \cdot h_3) \cdot x$

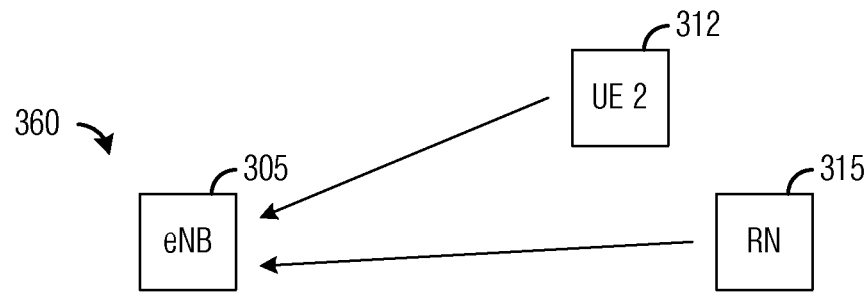
*Fig. 3f*
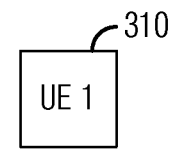
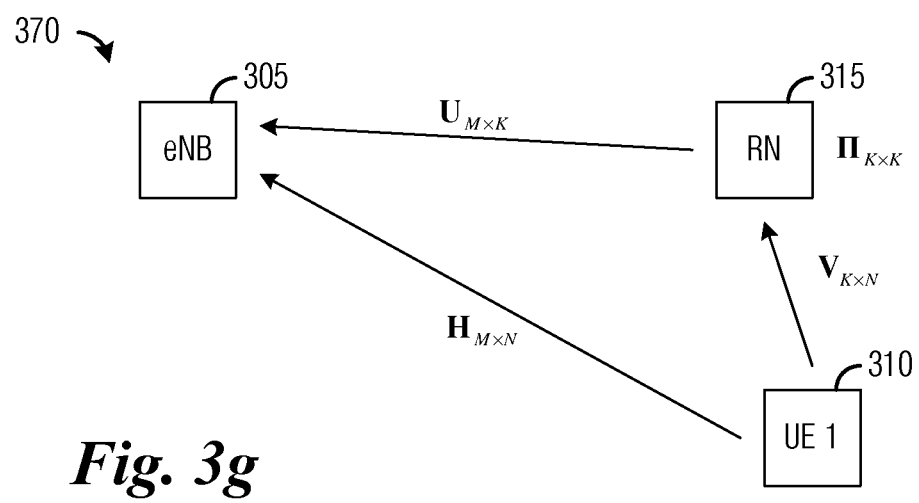
*Fig. 3g*

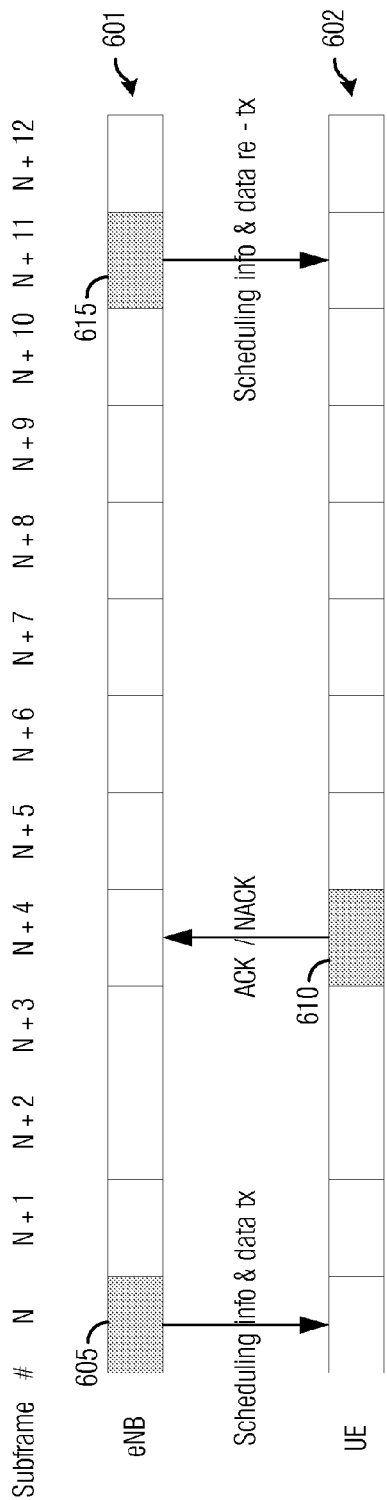
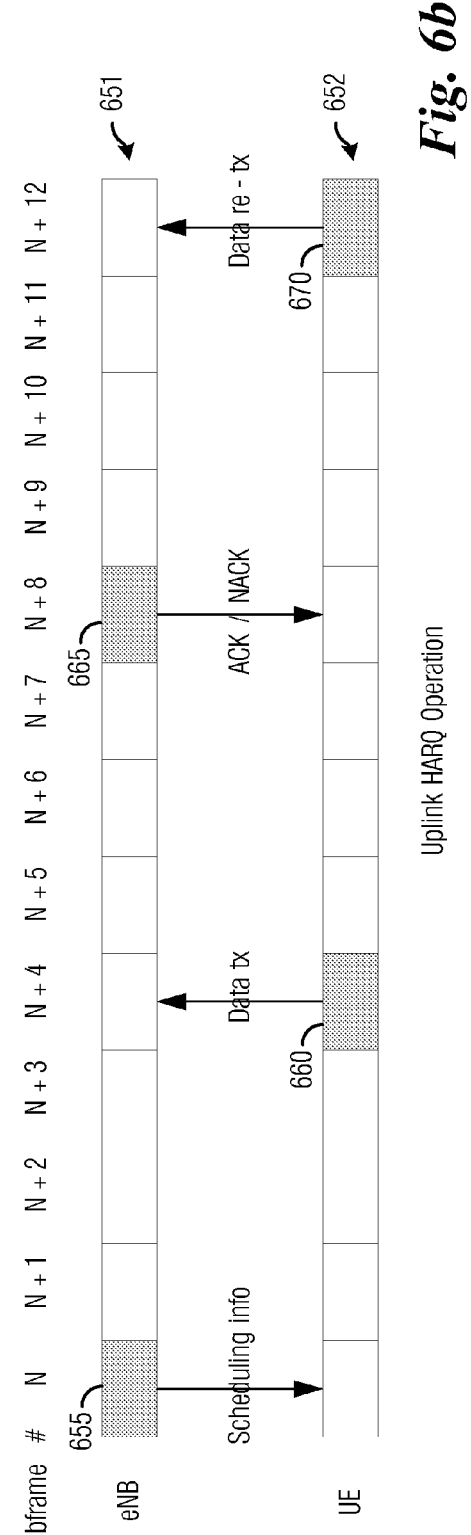

SYSTEM AND METHOD FOR RELAYING TRANSMISSIONS IN WIRELESS COMMUNICATIONS

This application claims the benefit of U.S. Provisional Application No. 61/248,520, filed on Oct. 5, 2009, entitled "Layer 1 Repeater Assisted Relay," which application is hereby incorporated herein by reference.

TECHNICAL FIELD

The present invention relates generally to wireless communications, and more particularly, to a system and method for relaying transmissions in wireless communications.

BACKGROUND

A Relay Node (RN) is considered as a tool to improve, e.g., the coverage of high data rates, group mobility, temporary network deployment, the cell-edge throughput, and/or to provide coverage in new areas. The RN is wirelessly connected to a wireless communications network via a donor cell (also referred to as a donor enhanced Node B (donor eNB or D-eNB)). The RN may serve as an eNB to one or more User Equipment (UE). To UE that is being served by the RN, the RN may appear identical to an eNB, scheduling uplink (UL) and downlink (DL) transmissions to the UE over an access link, which is between the RN and the UE.

The donor eNB may allocate a portion of its wireless resource (UL and/or DL) to the RN so that the RN may service UEs. The wireless resource may comprise of resources in time, frequency, code, or space domain, or a combination thereof. The wireless resource given to the RN may be referred to as a Relay Link (RL) and may be allocated by the donor eNB in a dynamic manner by treating the RN as a UE and assigning transmission opportunities based on requests from the RN, in a persistent or semi-persistent manner by reserving an amount of wireless resources for the RL, or in a combination of both a dynamic and persistent (or semi-persistent) manner.

SUMMARY

These and other problems are generally solved or circumvented, and technical advantages are generally achieved, by embodiments of a system and method for relaying transmissions in wireless communications.

In accordance with an embodiment, a method for combined relay node operation is provided. The method includes determining an operating mode of the combined relay node. The combined relay node includes a repeater and a relay. The method also includes if the operating mode is repeater on mode, amplifying and forwarding received signals, and storing subframes. The subframes are demodulated and decoded versions of the received signals. The method further includes if the operating mode is repeater off mode, amplifying and forwarding a control zone of signals received while the operating mode is repeater off mode, and transmitting subframes stored while the operating mode is repeater on mode.

In accordance with another embodiment, a method for relay node operation is provided. The method includes receiving a first transmission from a communications controller, transmitting a response responsive to the received first transmission, and transmitting to a communications device data at a transmission resource allocated for a second transmission. The first transmission includes scheduling information for the second transmission destined for the communications device and data to be transmitted in the second transmission.

In accordance with another embodiment, a method for relay node operation is provided. The method includes receiving a first transmission from a communications controller, receiving a second transmission from a communications device based on scheduling information and an identifier, decoding the second transmission, and transmitting a response responsive to the second transmission to the communications controller. The first transmission includes the scheduling information for the second transmission originating at the communications device and the identifier for the communications device.

In accordance with another embodiment, a relay node is provided. The relay node includes a repeater coupled to a signal input, and a relay coupled to the signal input. The repeater amplifies and forwards at least a portion of a signal provided by the signal input, and the relay demodulates and decodes the signal provided by the signal input, stores at least a portion of the demodulated and decoded signal, and transmits at least a portion of the demodulated and decoded signal. The repeater is off while the relay transmits, and the relay receives while the repeater transmits.

An advantage of an embodiment is that beamforming gain for transmissions is offered, effectively increasing the rank of the communications system.

A further advantage of an embodiment is that compatibility with legacy communications devices is maintained.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3f is a diagram of a communications system where an L1-TII RN and a UE transmit to an eNB;

FIG. 3g is a diagram of a communications system with signal components highlighted;

FIG. 6a is a diagram of a sequence of subframes at an eNB and a UE involved in DL HARQ operation;

FIG. 6b is a diagram of a sequence of subframes at an eNB and a UE involved in UL HARQ operation;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant communications system with at least one Layer 1 repeater assisted Type II relay node (L1-TII RN). The invention may also be applied, however, to other communications system with support for relay nodes, such as 3GPP LTE-Advanced compliant communications systems.

In general, a Layer 1 repeater relay node (L1 RN) may function as an amplify-and-forward device, wherein the L1 RN receives transmissions and simply amplifies the received transmissions before re-transmitting the now amplified received transmissions. The L1 RN typically amplifies the received transmissions and does not demodulate the received transmissions.

On the other hand, a Type II relay node (TII RN) may be capable of performing signal processing on the received signal prior to transmitting signals that it receives. As an example, a TII RN may be capable of down converting a received transmission on a downlink (DL), uplink (UL), or both, and demodulating the received transmission for the DL and/or UL. The TII RN may also be capable of re-encoding previously decoded transmissions, as well as receiving enhanced Node B (eNB) acknowledgement (ACK)/negative acknowledgement (NACK) packets transmitted to an user equipment (UE) plus special indicators intended for the TII RN itself.

On the DL, the TII RN receives and buffers DL data intended for UEs being served by the TII RN from the donor eNB over a relay link (RL). The TII RN may further perform multi-user diversity scheduling to prioritize the transmissions of the data to the intended UEs over an access link, based on channel conditions being experienced by each UE over the access link, as well as based on other criteria, such as Quality of Service (QoS) and fairness. On the UL, the TII RN receives and buffers UL data from UEs that it is serving and then forwards the UL data to the donor eNB over the RL. Again, the RN may desire to use multi-user diversity scheduling.

Figure 1:
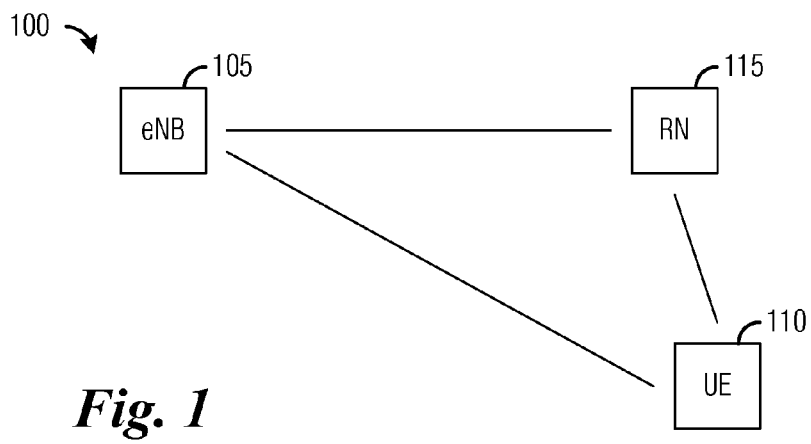
FIG. 1 is a diagram of a communications system.

FIG. 1 illustrates a communications system 100. Communications system 100 includes an eNB 105 that is serving a UE 110. eNB 105 may control transmissions to and from UE 110 by allocating resources to UE 110 and allowing transmissions to and from UE 110 to occur only over the allocated resources. Communications system 100 also includes a RN 115. RN 115 may utilize resources donated by eNB 105 to relay transmissions from eNB 105 to UE 110 or UE 110 to eNB 105. RN 115 may be a simple L1 RN, a TII RN, or a combination L1-TII RN.

An L1-TII RN may have the following constraints:

A TII RN part of an L1-TII RN should not have a separate cell identifier (cell ID) and thus would not create any new cell(s).

The TII RN part of the L1-TII RN should be able to relay to/from legacy UEs (i.e., 3GPP Release 8 UEs).

A legacy UE should not be aware of the presence of a TII RN part of the L1-TII RN.

The L1-TII RN transmits and receives by time division multiplexing (TDM) in a same UL or DL band of its donor eNB.

For a relay facilitated legacy UE within an eNB's physical downlink control channel (PDCCH) coverage, the legacy UE should receive legacy PDCCH common reference signal (CRS) from the eNB and be able to receive physical downlink shared channel (PDSCH) transmissions facilitated by the L1-TII RN.

An L1-TII RN provides the amplify-and-forward operation of an L1 repeater during RN receiving, combined with signal processing during RN transmitting, and may yield a continuous enhancement of signal strength observed at UEs served by the L1-TII RN. The L1-TII RN may also provide beamforming gain in hybrid automatic repeat request (HARQ) retransmission typically not available if only an L1 repeater is used. On an UL, the L1-TII RN may be able to take advantage of additional antenna space and HARQ buffer capacity (as offered by a RN) to release UE resources that may otherwise be consumed by HARQ retransmissions. On the DL, the L1-TII RN may offer beamforming gain for DL HARQ retransmission, thereby effectively increasing the rank of the UL multiple input, multiple output (MIMO) communications system, and may be fully compatible with legacy UEs.

In general, the operation of an L1-TII RN may be defined based on a status of its L1 repeater, e.g., L1 ON or L1 OFF. While the L1 repeater of an L1-TII RN is on (L1 ON), the TII relay of the L1-TII RN may be assumed to be able to:

down-convert a signal received at the L1 repeater (e.g., the repeater signal) and demodulate the repeater signal for both DL and UL;

re-encode previously decoded transmissions; and receive eNB ACK/NACK to UEs in addition to indicators intended for the L1-TII RN itself.

While the L1 repeater of the L1-TII RN is off (L1 OFF), the TII relay of the L1-TII RN may be assumed to be able to:

communicate its decoding success/failure with the eNB for both DL and UL; and spatially multiplex re-encoded transmissions with a UE signal directly sent to the eNB.

Main assumptions of the L1-TII RN include:

the L1-TII RN's TII relay may be able to receive by down-converting a radio frequency (RF) waveform of the signal received by the L1 repeater, performing analog/digital sampling, and demodulating baseband signals contained in the received signal; and when the TII relay is transmitting, the transmission of the L1 repeater is turned off.

Figure 2:
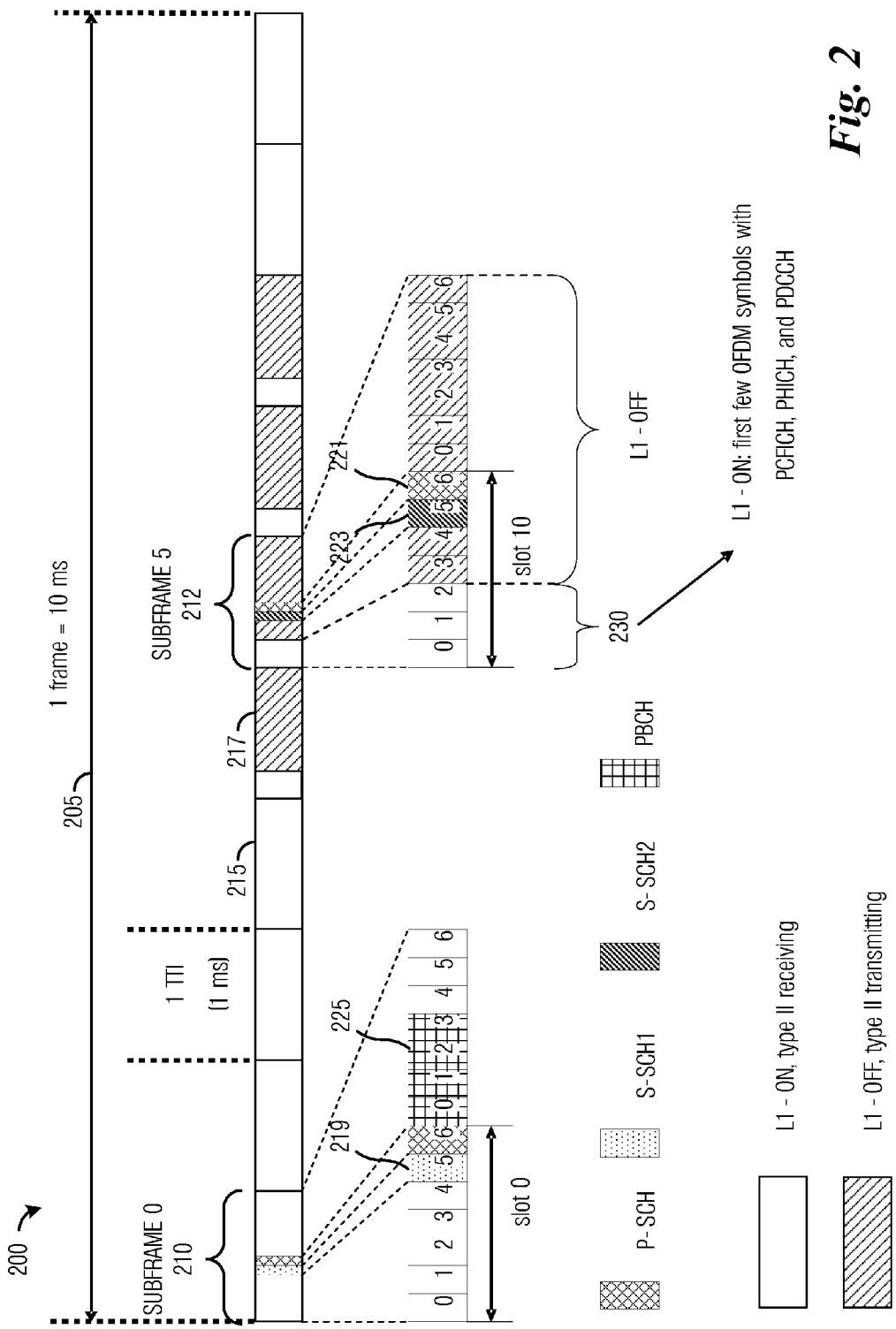
FIG. 2 is a diagram of a frame structure of transmissions made in a communications system including an L1-TII RN.

FIG. 2 illustrates a frame structure 200 of transmissions made in a communications system including a L1-TII RN. As shown in FIG. 2, a single frame 205 is illustrated. Frame 205 lasts 10 ms and includes a number of subframes, such as subframe 0 210 and subframe 5 212, with each subframe lasting 1 ms. Each subframe includes multiple slots. For example, subframe 0 210 includes two slots (slot 0 and slot 1), with each slot comprising seven orthogonal frequency division multiplex (OFDM) symbols or transmission resources (numbered from 0 to 6).

As shown in FIG. 2, a subframe, slot, or transmission resource may be used to indicate a transmission of a variety of information or a different operating mode. For example, an un-crosshatched box (such as box 215) may be used to indicate that an L1 repeater of an L1-TII RN is in an ON state, while a box crosshatched with right leaning lines (such as box 217) may be used to indicate that the L1 repeater is in an OFF state. Similarly, a box crosshatched with a light shading (such as box 219) may indicate that a first secondary synchronization channel (S-SCH1) is being transmitted, a box crosshatched with fine intersecting diagonal lines (such as box 221) may indicate that a primary synchronization channel (P-SCH) is being transmitted, a box crosshatched with left leaning diagonal lines (such as box 223) may indicate that a second secondary synchronization channel (S-SCH2) is being transmitted, and a while a box crosshatched with a fine grid pattern (such as box 225) may indicate that a physical broadcast channel (PBCH) is being transmitted.

Furthermore, the L1 repeater may be ON for a portion of a subframe to amplify-and-forward control transmissions. For example, in subframe 5 212, although the L1 repeater may be in an OFF state, the L1 repeater may actually be ON for a first few transmission resources (transmission resources numbered 0 to 2 (shown as control zone 230)) and OFF for the remainder of the transmission resources of the subframe. While the L1 repeater is ON (independent of its state, i.e., ON state or OFF state), all DL physical channels are amplified-and-forwarded. The DL physical channels may be separated into distinct groups, including:

1. physical control format indicator channel (PCFICH), physical hybrid automatic repeat request indicator channel (PHICH), PDCCH, and CRS;

2. P-SCH, S-SCH, PBCH, and CRS; and

3. PDSCH.

The first group of physical channels (PCFICH, PHICH, PDCCH, and CRS) may be located in a first few OFDM symbols of each subframe. The first few OFDM symbols make up the control zone and may be amplified and forwarded by the L1 repeater, independent of the remainder of the subframe and its state. For example, the L1 repeater may be ON for the remainder of the subframe (e.g., subframe 0 210) or the L1 repeater may be OFF for the remainder of the subframe (e.g., subframe 5 212).

For a subframe whose data portion is transmitted by the TII relay, such as subframe 5 212, the number of OFDM symbols in the control zone are known to the L1-TII RN either a priori in an eNB resource allocation or by fast detection of the PCFICH. The L1 repeater being ON in the control zone ensures that coverage is consistent for all UEs.

The second group of physical channels (PSCH, SSCH, PBCH, and CRS) may be assumed as being known a priori to the L1-TII RN and may be generated locally as if the L1 repeater was still ON during a TII relay transmitting period.

Figure 3A:
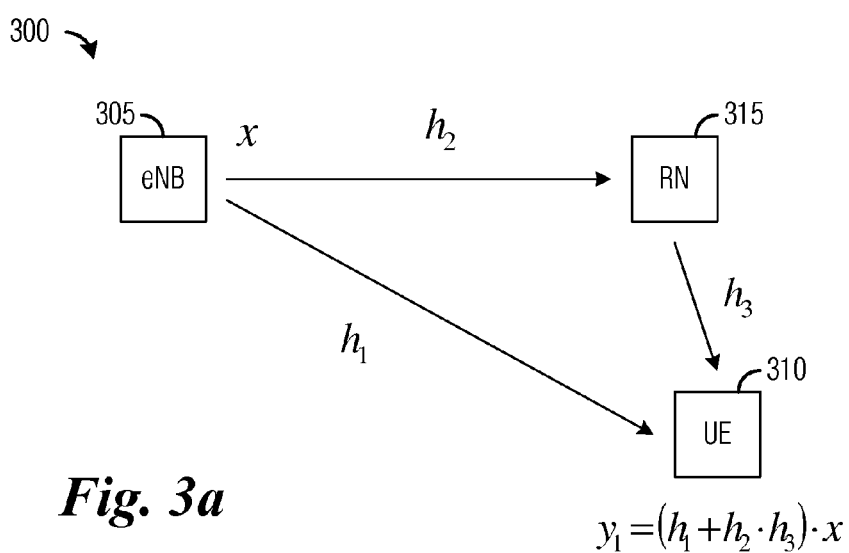
FIG. 3a is a diagram of channels in a communications system.

FIG. 3a illustrates channels in a communications system 300. Communications system 300 includes an eNB 305 serving a UE 310 with an L1-TII RN 315 assisting eNB 305. When the L1 repeater of L1-TII RN 315 is ON, a direct channel between eNB 305 and UE 310 may be represented as $H_1$, a relay link between eNB 305 and L1-TII RN 315 may be represented as $H_2$, and an access link between L1-TII RN 315 and UE 310 may be represented as $H_3$. A signal transmitted by eNB 305 may be represented as x, while a signal received at UE 310 may be represented as $y_1$. In terms of frequency response, the signal received at UE 310 $y_1$ may be a sum of the direct link and a product of the relay link and the access link. The signal received at UE 310 $y_1$ may be expressible as:

$$y_1 = (H_1 + H_2 \cdot H_3) \cdot x.$$

Figure 3B:
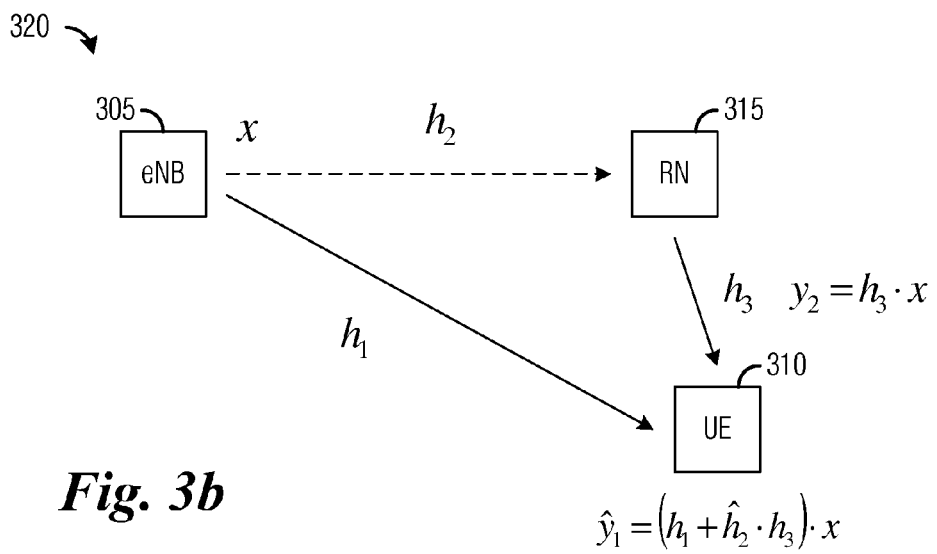
FIG. 3b is a diagram of DL channels in a communications system.

FIG. 3b illustrates DL channels in a communications system 320. Communications system 320 includes an eNB 305 serving a UE 310 with an L1-TII RN 315 assisting eNB 305. When the L1 repeater of L1-TII RN 315 is OFF, L1-TII RN 315 may transmit signals that are locally stored at L1-TII RN 315 or generated by L1-TII RN 315 without the signal going through the relay link $H_2$ again.

There may be two types of signals generated by L1-TII RN 315: common signals $x_C$ and dedicated signals $x_D$. In order to ensure backward compatibility with legacy UEs, these two types of signals may be treated differently by L1-TII RN 315. The common signals $x_C$ comprise the second group of physical channels discussed above, including PSCH, SSCH, PBCH and CRS. Among these physical channels, PSCH, SSCH and CRS are cell-specific. Once a cell identifier of eNB 305 is known to L1-TII RN 315 and the timing of eNB 305 is acquired, these physical channels may be generated by L1-TII RN 315 with high accuracy. The PBCH may carry three information fields: system bandwidth, PHICH configuration, and frame number. The frame number, though varying in time, may be predictable at L1-TII RN 315. The system bandwidth and PHICH configuration, when changed, may be notified by eNB 305. Such changes may occur rather infrequently and may only introduce a negligible amount of overhead. Since the relay link is usually static, the channel response of the relay link $H_2$ may be assumed to be accurately estimated by L1-TII RN 315 over time and estimate of the relay link $\hat{H}_2$ is approximately equal to $H_2$ and does not typically need updates during a 4 ms TII relay transmission.

The common signals $x_C$ may be transmitted simultaneously by eNB 305 (in an as is form) and by L1-TII RN 315 (in a modified form by adding a coefficient of $\hat{H}_2$ to the signal in the frequency domain, where $\hat{H}_2$ is an estimate, made by the L1-TII RN 315, of the channel response of the relay link between eNB 305 and L1-TII RN 315 $H_2$). As a result, the common signal $x_C$ may be received at UE 310 as $$\hat{y}_1 = (H_1 + \hat{H}_2 \cdot H_3) \cdot x_C$$
$$\approx (H_1 + H_2 \cdot H_3) \cdot x_C,$$

which maintains the same channel characteristics as if the L1 repeater were still ON, thereby providing backward compatibility for legacy UEs and will not disrupt existing UE operations.

The dedicated signal $x_D$ may be a new PDSCH served to an advanced UE, such as an LTE-Advanced UE, with dedicated pilots. L1-TII RN 315 may apply an optimized beamforming vector or precoder matrix, P, to maximize the signal to noise ratio (SNR) and the data rate of the received dedicated signal $x_D$ expressible as $$y_2 = H_3 \cdot P \cdot x_D.$$

The TII relay dedicated signal may therefore be optimally beamformed without being constrained by channel response of the relay link $H_2$. If no new overhead may be introduced, the access link channel $H_3$ may be measured by L1-TII RN 315 based on direction of arrival (DOA) in a frequency division duplexing (FDD) scenario or based on channel reciprocity in a time division duplexing (TDD) scenario. If an additional overhead may be allowed, another option usable in the FDD scenario may be to use relay specific reference signals for UE channel quality indicator (CQI) feedback and/or precoding matrix indicator (PMI) feedback.

According to an embodiment, L1-TII RN 315 may, once data to be transmitted by eNB 305 has been obtained, synchronize with PDSCH transmissions from eNB 305 during a TII transmitting period. In such a situation, a signal sent directly from eNB 305 and received at UE 310 is expressible as $$H_1 \cdot x_D,$$

while a signal sent separately from L1-TII RN 315 and received at UE 310 is expressible as $$\hat{H}_2 \cdot H_3 \cdot x_D.$$

Then, a total received signal at UE 310 is expressible as $$(H_1 + \hat{H}_2 \cdot H_3) \cdot x_D \approx (H_1 + H_2 \cdot H_3) \cdot x_D,$$

with the CRS modulated in a similar fashion. Therefore, the CRS may be used for demodulating the PDSCH. No additional dedicated pilot from L1-TII RN 315 may be required and HARQ retransmission during the TII relay transmitting period appears approximately the same as during the L1 repeater ON period. HARQ retransmission timing constraints when both L1 repeater and TII relay transmissions are used may be eliminated. The donor eNB indicates to the UE (as well as the L1-TII RN) whether a data transmission is CRS based or dedicated reference signal (DRS) based.

Figure 3C:
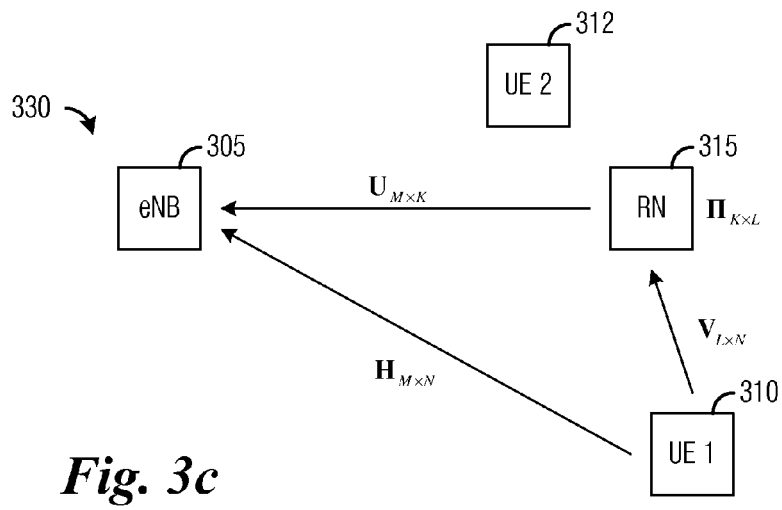
FIG. 3c is a diagram of UL channels in a communications system.

FIG. 3c illustrates UL channels in a communications system 330. For UL communications, the L1-TII RN may have the same timing requirement as for DL communications. Namely, the L1 repeater and the TII relay of the L1-TII RN cannot be transmitting simultaneously. The L1 repeater and the TII relay transmission must alternate in time with the L1 repeater turned ON only when the TII relay is receiving and the L1 repeater turned OFF when the TII relay is transmitting. According to an embodiment, the L1 repeater is always turned ON (therefore the TII relay is always receiving) during a control zone of a subframe.

A benefit of the TII relay for UL may lie in its function as an additional antenna space and as an additional HARQ buffer for all UEs. The TII relay to eNB link may form a fixed beam for UL interference reduction and also provide an extra antenna space for the UL that would otherwise be unavailable due to limitations on UL antenna space.

As shown in FIG. 3c, a channel between eNB 305 and L1-TII RN 315 is assumed to be relatively stable, i.e., the channel may be estimated by a relatively infrequent UL sounding. The channel between UE 310 and eNB 305 may be represented as $H_{M \times N}$, a channel between UE 310 and L1-TII RN 315 may be represented as $V_{L \times N}$, and a channel between L1-TII RN 315 and eNB 305 may be represented as $U_{M \times K}$, where M is a number of eNB receive antennas, K is a number of L1-TII RN transmit antennas, and N is a number of UE transmit antennas.

eNB 305 may learn $U_{M \times K}$ from signals from L1-TII RN 315 without relaying any signals from UE 310, and eNB 305 may inform L1-TII RN 315 a form of channel state information (CSI) $U_{M \times K}$, potentially its inverse matrix if nonsingular. If the DL and UL channels have reciprocal properties, such as in time domain duplexing communications systems, the CSI may be inferred by L1-TII RN itself.

As shown in FIG. 3c, a MIMO channel matrix between UE 310 and L1-TII RN 315 may be denoted $V_{L \times N}$, where L is a number of L1-TII RN receive antennas, and a receive-to-transmit antenna coupling is denoted by $\pi_{K \times L}$. Without loss of generality, a number of L1-TII RN receive antennas is assumed to be equal to a number of L1-TII RN transmit antennas, i.e., K=L, since it may be straightforward to generalize the result to unequal receive and transmit antenna dimensions.

Figure 3D:
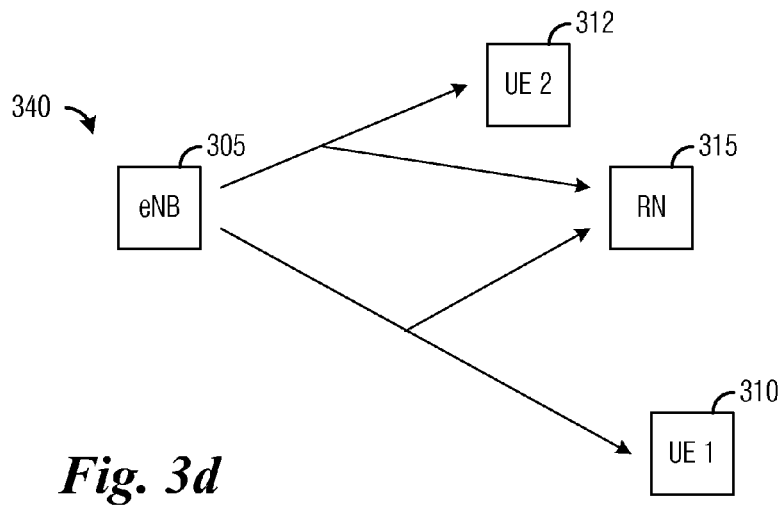
FIG. 3d is a diagram of a communications system where an L1-TII RN monitors all transmissions made by an eNB.

FIG. 3d illustrates a communications system 340 where L1-TII RN 315 monitors all transmissions made by eNB 305. It may be important for L1-TII RN 315 to learn which UE is being scheduled and controlled by eNB 305. Generally, L1-TII RN 315 may identify UEs by monitoring control signals transmitted to the UEs by eNB 305. Typically, L1-TII RN 315 may have good reception conditions and may be able to decode all eNB transmissions at a reasonably high success rate. In this situation, L1-TII RN 315 may be acting as a friendly eavesdropper of control and scheduling signals. L1-TII RN 315 may make use of the obtained knowledge to decode signals transmitted by UEs.

Figure 3E:
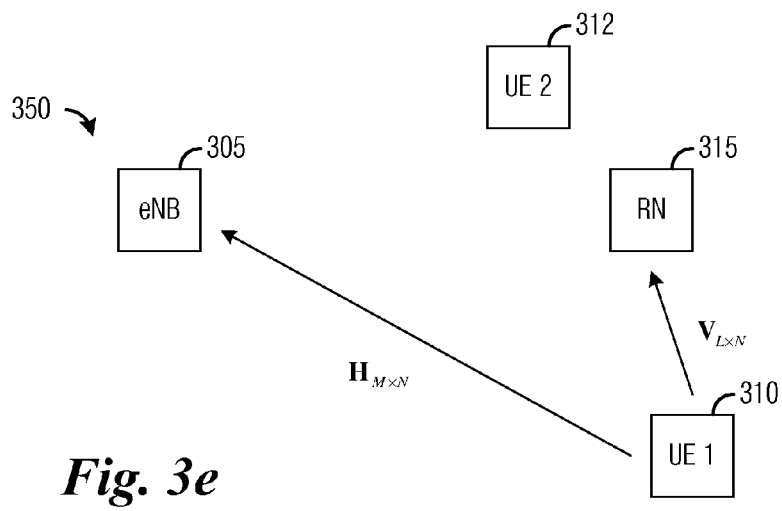
FIG. 3e is a diagram of a communications system where an L1-TII RN monitors and decodes scheduled UE transmissions.

FIG. 3e illustrates a communications system 350 where L1-TII RN 315 monitors and decodes scheduled UE transmissions. As shown in FIG. 3e, channel matrices $H_{M \times N}$ and $V_{K \times N}$ may be estimated by eNB 305 and L1-TII RN 315, respectively. When a packet transmitted by UE 310 requires HARQ retransmission, L1-TII RN 315 may re-encode the packet transmitted by UE 310 and spatially multiplex a retransmission with other UL UE 310 signals during a TII relay retransmission. FIG. 3f illustrates a communications system 360 where L1-TII RN 315 and UE 312 transmit to eNB 305.

FIG. 3g illustrates a communications system 370 with signal components highlighted. The amplify-and-forward operation of the L1 repeater may be characterized by a total MIMO matrix channel from UE 310 to eNB 305 by way of L1-TII RN 315. The amplified-and-forwarded component received at eNB 305 may be denoted as $$y_{M \times 1}^{(RS)} = U_{M \times K} \cdot V_{K \times N} \cdot P_{N \times D} \cdot d_{D \times 1},$$

where $d_{D \times 1}$ is a data symbol and $P_{N \times D}$ is a precoder matrix. The transmission of UE 310 received at eNB 305 may be denoted as $$y_{M \times 1}^{(UE)} = H_{M \times N} \cdot P_{N \times D} \cdot d_{D \times 1}.$$

There may be differences in transmissions made by the L1 repeater and the TII relay components of L1-TII RN 315. With the L1 repeater, a relay receive-to-transmit antenna coupling may only be a user-independent matrix, meaning that the L1 repeater cannot optimize a coupling matrix response $\pi_{K \times K}$ over an access link channel matrix $V_{K \times N}$ for each UE. A reason being that an operator of the L1 repeater receive-totransmit coupling is performed in the RF range where subband amplitude and phase adjustments may not be practical. Therefore, only in the TII relay transmissions are subband specific precoding for optimized relay beamforming possible.

In addition to the mathematical notation shown in FIG. 3c, $d'_{D'\times 1}$ is defined as a data vector from a UE packet stored at the TII relay of L1-TII RN 315 for retransmission, $P'_{K\times D'}$ is a precoder matrix for TII relay retransmission, D' is a rank of a TII relay retransmission, assuming K>D, D'<K−D. Then L1-TII RN 315 with simultaneous direct UE-to-eNB transmission results in a received signal at eNB 305 expressible as $$y_{M\times 1} = [\,U_{M\times K} \quad H_{M\times N}\,] \begin{bmatrix} P'_{K\times D'} & O_{K\times D} \\ O_{N\times D'} & P_{N\times D} \end{bmatrix} \begin{bmatrix} d'_{D'\times 1} \\ d_{D\times 1} \end{bmatrix},$$

where eNB 305 may assign precoder matrices that multiplex a direct UE-to-eNB data $d_{D\times 1}$ and TII relay data $d'_{D'\times 1}$, with a total UL MIMO rank of (D+D').

Figure 4:
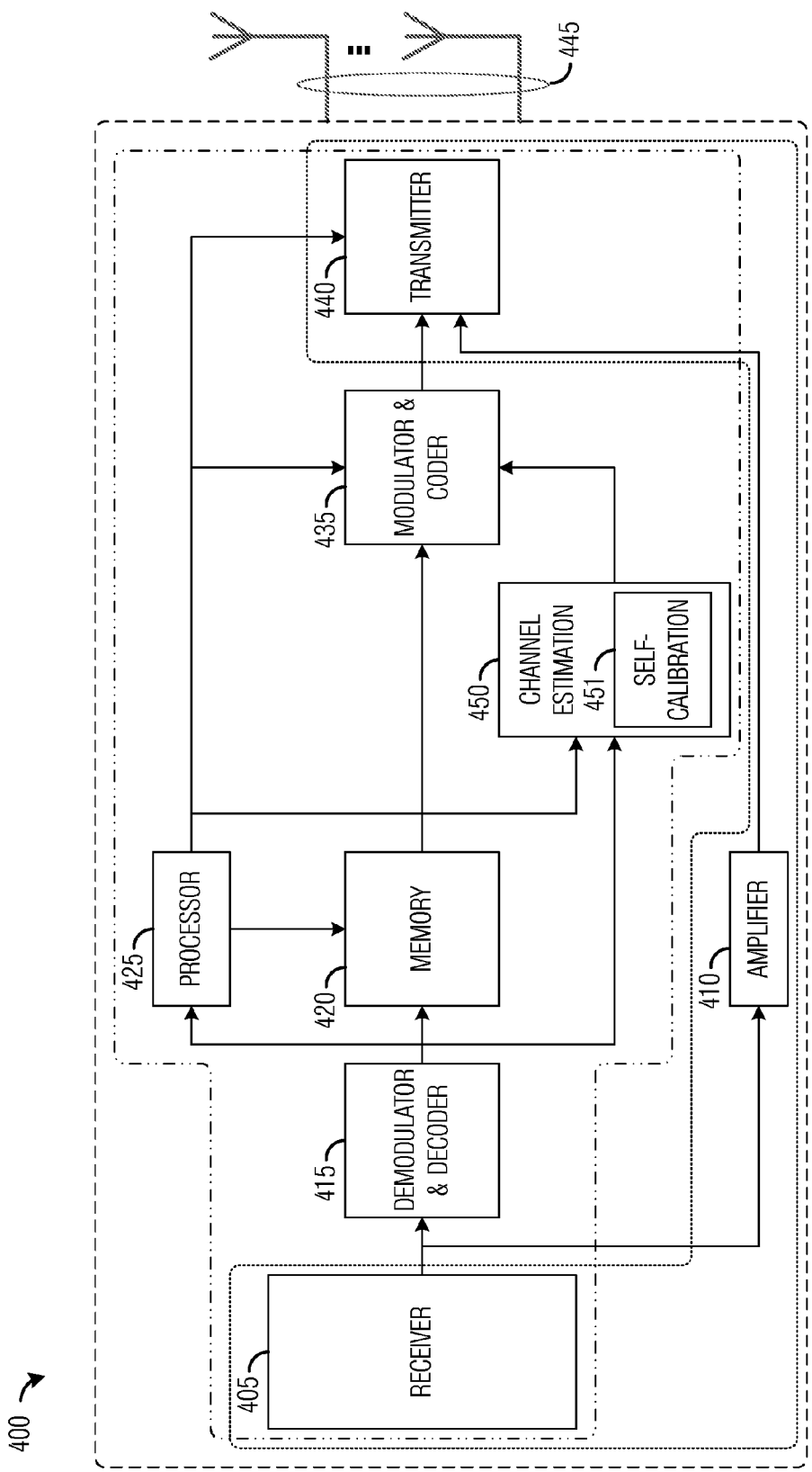
FIG. 4 is a diagram of an L1-TII RN.

FIG. 4 illustrates an L1-TII RN 400. L1-TII RN 400 includes a receiver 405 for receiving transmitted signals. The transmitted signals may originate from a donor eNB, such as eNB 305, or a UE serviced by L1-TII RN 400, such as UE 310. L1-TII RN 400 also includes an amplifier 410 for amplifying the received signal for use in amplifying-and-forwarding when L1-TII RN 400 is operating as a L1 repeater. The amplified received signal may then be provided to a transmitter 440 where the amplified received signal may be prepared for over-the-air transmission to an intended recipient, such as a UE or an eNB, by way of antennas 445. Collectively, receiver 405, amplifier 410, and transmitter 440 make up the L1 repeater of L1-TII RN 400.

L1-TII RN 400 also includes a demodulator & decoder 415 and a memory 420 that may be used for a TII relay portion of L1-TII RN 400. Demodulator & decoder 415 may be used to demodulate & decode the received signal for storage in memory 420. In addition to demodulating and decoding the received signal, demodulator & decoder 415 may also perform analog to digital conversion. Memory 420 may store the received signal or a portion thereof in an undemodulated/undecoded, demodulated/undecoded, or demodulated/decoded form. Memory 420 may also store control signals from the received signal. According to an embodiment, memory 420 may store only control signals that L1-TII RN 400 is not capable of generating by itself.

L1-TII RN 400 also includes a channel estimation unit 450 that may be used to estimate a channel between L1-TII RN 400 and the eNB. Channel estimation unit 450 may estimate the channel $H_2$ by examining pilots transmitted by the eNB or by measuring transmissions made by the eNB over a period of time. Channel estimation unit 450 may further include a self-calibration unit 451 to estimate the frequency response for the signal path between receiver 405 and transmitter 440. Thus channel estimation unit 450 may produce an estimate of an overall channel including the over-the-air channel between the eNB and the L1-TII RN 400 ($H_2$), and the signal path between receiver 405 and transmitter 440 using self-calibration unit 451, since the overall channel is what a signal may experience while the L1 repeater is ON. The channel estimate may be provided to a modulator & coder 435 such that modulator & coder 435 may multiply a transmit symbol, in the frequency domain, with a coefficient that is based on such a channel estimate. The application of the coefficient may make it appear to a receiver of the transmission (e.g., the UE) that the information originates from the eNB rather than L1-TII RN 400.

A processor 425 coupled to demodulator & decoder 415 may process control signals present in the received signal. Processor 425 may also be used to control and/or adjust operation of L1-TII RN 400 based on the control signals present in the received signal. For example, processor 425 may switch an operating mode of L1-TII RN 400 from L1 repeater ON to L1 repeater OFF and vice versa based on the control signals. Furthermore, processor 425 may be used to generate control signals. In an alternative embodiment, a separate unit of L1-TII RN 400 may be used to generate control signals.

Generally speaking, the transmissions between L1-TII RN 400 and the UEs are scheduled by the donor eNB. Such scheduling information is provided to the UE (as well as L1-TII RN 400). The scheduling information may be received by L1-TII RN 400 in transmissions made by the donor eNB and received by L1-TII RN 400. The scheduling information may include the information whether the transmission is CRS based or DRS based. Processor 425 may be used to process scheduling information and to execute such a scheduled transmission (for DL) or reception (for UL) via its control over a modulator & coder 435, and a transmitter 440.

Modulator & coder 435 coupled to channel estimation unit 450 and processor 425 may be used to encode and modulate a transmission that was previously demodulated and decoded by L1-TII RN 400. Modulator & coder 435 may convert the information contained in the transmission to transmit symbols based on the scheduling instruction that is received from processor 425. If the transmission is CRS based, modulator & coder 435 may further multiply the transmit symbols (in the frequency domain) with the coefficient $\hat{H}_2$, which is an estimation of the channel response of $H_2$ made by channel estimation unit 450. Output of modulator & coder 435 may be passed to transmitter 440, which may output the signals to antennas 445 for transmission. Transmitter 440 may also map output from modulator & coder 435 onto beamforming vector(s) where appropriate. Processor 425 may also control when transmitter 440 should transmit the output signal from modulator & coder 435 and when transmitter 440 should transmit the output signal from amplifier 410. Collectively, receiver 405, demodulator & decoder 415, memory 420, processor 425, channel estimation unit 450, modulator & coder 435, and transmitter 440 make up the TII relay of L1-TII RN 400.

Figure 5A:
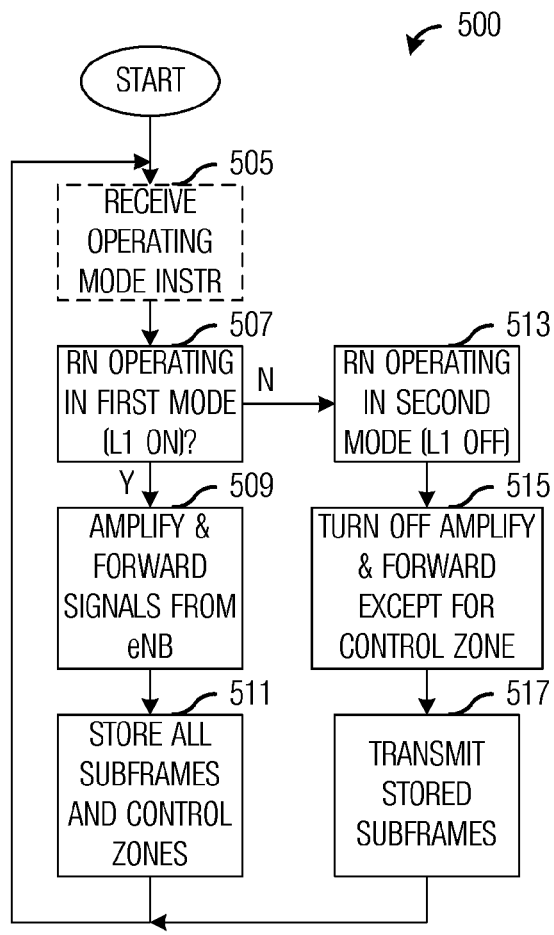
FIG. 5a is a flow diagram of L1-TII RN operations in relaying transmissions.

FIG. 5a illustrates a flow diagram of L1-TII RN operations 500 in relaying transmissions. L1-TII RN operations 500 may be indicative of operations occurring in an L1-TII RN, such as L1-TII RN 400, as the L1-TII RN operates to relay messages from an eNB to UEs served by the L1-TII RN. L1-TII RN operations 500 may occur while the L1-TII RN serves the UEs and while the eNB has transmissions to make to the UEs.

L1-TII RN operations 500 may begin with the L1-TII RN receiving an optional operating mode instruction from the eNB (block 505). The operating mode instruction from the eNB may instruct the L1-TII RN to operate in a particular operating mode, e.g., L1 repeater ON mode or OFF mode. The operating mode instruction may specify a time and/or a duration that the L1-TII RN is to operate in the particular operating mode. According to an embodiment, in lieu of the operating mode instruction from the eNB, the L1-TII RN may be configured as to when to be operating in L1 repeater ON or OFF using control signals transmitted to the L1-TII RN. For example, the control signals may include an indicator to indicate a desired operating mode for the L1-TII RN.

The L1-TII RN may then perform a check to determine its operating mode (block 507). If the L1-TII RN is operating in a first mode, i.e., the L1-TII RN is operating in L1 repeater ON mode, then the L1-TII RN may amplify-and-forward all received signals from the eNB (block 509) as well as store (buffer) all subframes and control zones (block 511). As discussed previously, control zones may be a first few transmission resources, e.g., OFDM symbols, of each subframe used by the eNB to transmit control information. Every subframe contains a control zone, independent of the L1-TII RN operating mode for a remainder of the subframe. The number of transmissions resources, i.e., the size of the control zone, may be specified in control signals provided by the eNB, or may be specified by an operator of a communications system in which the eNB, the L1-TII RN, and the UEs are operating. The L1-TII RN may continue operating in the first mode with checks to determine if it needs to switch operating modes.

If the L1-TII RN is operating in a second mode (block 513), i.e., the L1-TII RN is operating in L1 repeater OFF mode, then the L1-TII RN may turn off its amplify-and-forward operation with the exception of control zones where amplify-and-forward operation may be maintained (block 515) and transmit subframes (along with control zones) stored while it was operating in L1 repeater ON mode (block 517). As discussed previously, a control zone of a subframe comprises a first few transmission resources of the subframe and may be used to convey control signaling. Depending on the nature of the information contained in the subframes, the L1-TII RN may transmit the subframes as is or the L1-TII RN may apply a coefficient, which is based on an estimation of the channel response of the channel between the eNB and the L1-TII RN including an internal path in the L1-TII RN, such as a path between receiver 405 and transmitter 440 and through amplifier 410, to the subframes, in the frequency domain, to make a UE receiving the subframe think that the subframe actually originated from the eNB rather than the L1-TII RN. The L1-TII RN may continue operating in the second mode with checks to determine if it needs to switch operating modes.

Figure 5B:
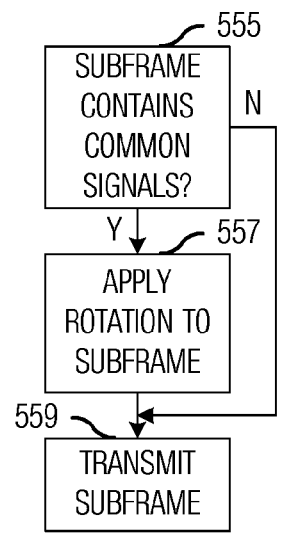
FIG. 5b is a flow diagram of L1-TII RN operations in transmitting stored subframes.

FIG. 5b illustrates a flow diagram of L1-TII RN operations 550 in transmitting stored subframes. L1-TII RN operations 550 may be an implementation of block 517, transmitting stored subframes. L1-TII RN operations 550 may begin with the L1-TII RN performing a check to determine if the subframe contains common signals (block 555). With common signals, e.g., for group two physical channels, the L1-TII RN is generating control signaling by itself rather than relying on the control signaling from the eNB, then the L1-TII RN may apply a coefficient based on a channel estimate of a channel between the eNB and the L1-TII RN, including the internal path in the L1-TII RN, such as the path between receiver 405 and transmitter 440 and through amplifier 410, to the subframe (block 557) prior to transmitting the subframe to the UE (block 559). However, if the subframe does not contain common signals, e.g., the L1-TII RN is not generating control information by itself and makes use of control signaling from the eNB, e.g., for group one physical channels, then the L1-TII RN may not apply the coefficient to the subframe prior to transmitting the subframe to the UE (block 559). Without the application of the coefficient, the transmission from the L1-TII RN may appear to be different from a corresponding transmission from the eNB and the UE receiving the two transmissions may make use of spatial multiplexing to improve overall performance.

In LTE and LTE-Advanced compliant communications systems with legacy UEs, HARQ timing in a DL channel may involve synchronous ACK/NACK transmissions and asynchronous re-transmission, while in an UL channel, both ACK/NACK transmissions and retransmissions are synchronous.

FIG. 6a illustrates a sequence of subframes at an eNB and a UE involved in DL HARQ operation. As shown in FIG. 6a, a first sequence of subframes 601 represents subframes from an eNB and a second sequence of subframes 602 represents subframes from a UE. For illustrative purposes, at subframe N (shown as subframe 605 in first sequence of subframes 601) the eNB makes a transmission to the UE, the transmission including scheduling information and data. At subframe N+4 (shown as subframe 610 in second sequence of subframes 602), the UE makes a transmission to the eNB, the transmission includes either an ACK or a NACK depending on the UE's ability to decode the transmission made by the eNB in subframe N.

For discussion purposes, assume that the UE was not able to decode the transmission made by the eNB at subframe N, i.e., the transmission at subframe N+4 contained a NACK. Since the UE was unable to decode the transmission made by the eNB, the eNB may wish to retransmit the transmission. At subframe N+11 (shown as subframe 615 in first sequence of subframes 601) the eNB makes a retransmission to the UE, the retransmission including scheduling information and the data. A timing of the retransmission made by the eNB at subframe N+11 may be arbitrary in nature and may not be dependent on the timing of the transmission of the NACK by the UE at subframe N+4.

FIG. 6b illustrates a sequence of subframes at an eNB and a UE involved in UL HARQ operation. As shown in FIG. 6b, a first sequence of subframes 651 represents subframes from an eNB and a second sequence of subframes 652 represents subframes from a UE. For illustrative purposes, at subframe N (shown as subframe 655 in first sequence of subframes 651) the eNB makes a transmission to the UE, the transmission includes scheduling information that grants the UE permission to transmit to the eNB. At subframe N+4 (shown as subframe 660 in second sequence of subframes 652), the UE transmits data to the eNB.

At subframe N+8 (shown as subframe 665 in first sequence of subframes 651) the eNB makes a transmission to the UE, the transmission includes either an ACK or a NACK depending on the eNB's ability to decode the transmission made by the UE in subframe N+4. For discussion purposes, assume that the eNB was not able to decode the transmission made by the UE at subframe N+4, i.e., the transmission at subframe N+8 contained a NACK. Implicit in the transmission of the NACK is a scheduling grant to the UE to retransmit the data. Since the eNB was unable to decode the transmission made by the UE, the UE may wish to retransmit the transmission. At subframe N+12 (shown as subframe 670 in second sequence of subframes 652) the UE makes a retransmission to the eNB, the retransmission includes the data.

However, in LTE and LTE-Advanced compliant communications systems with legacy UEs and L1-TII RNs, compatibility with legacy UEs must be maintained. Therefore, operation of L1-TII RNs must be made transparent to the legacy UEs, i.e., the legacy UEs may not be aware of the presence of the L1-TII RNs and therefore may not be on the lookout for transmissions made by the L1-TII RNs. It may be possible to maintain legacy HARQ timing for both DL and UL HARQ transmissions by having the eNB prepare the L1-TII RN for DL or UL transmissions.

Figures 7A, 7B:
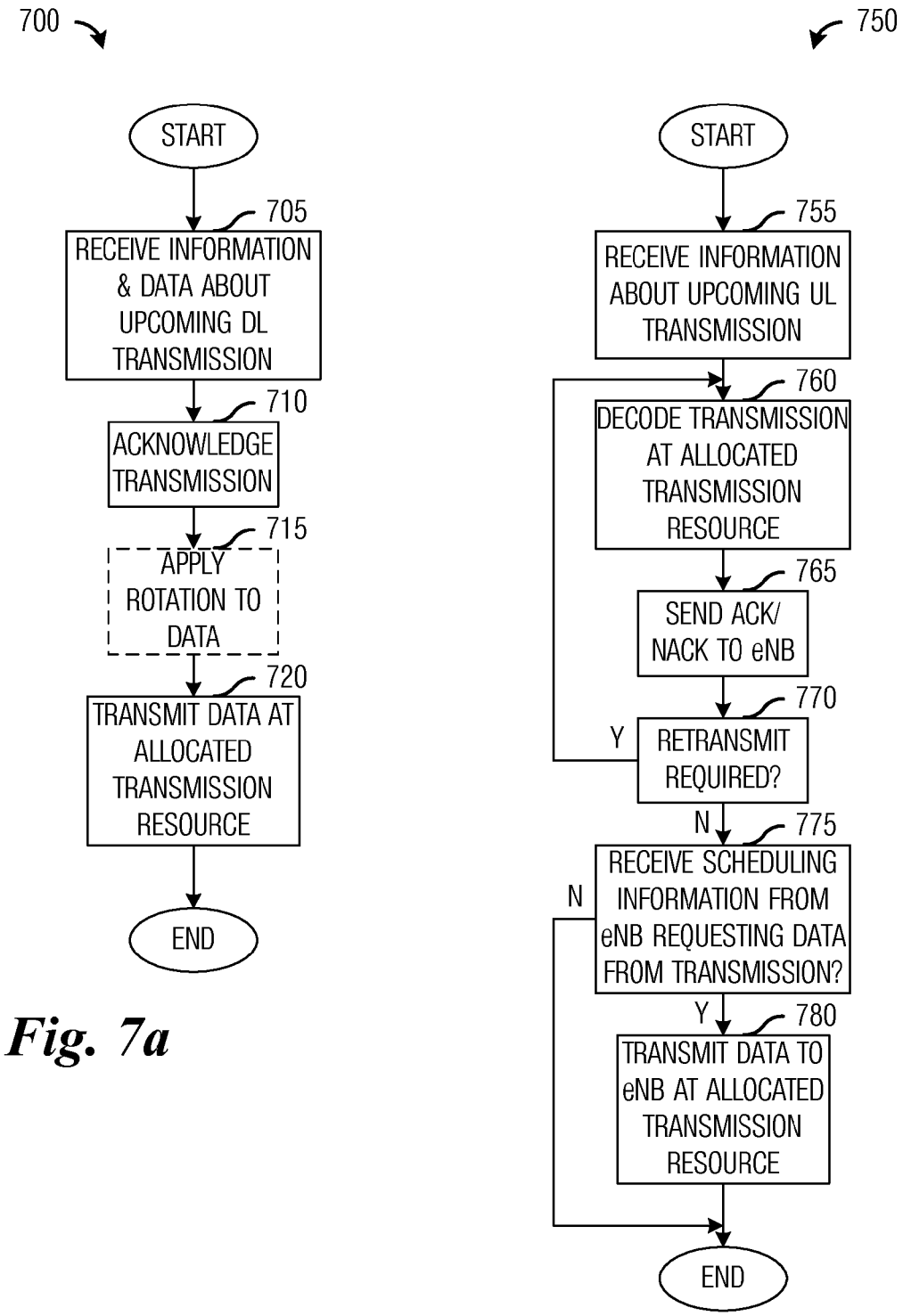
FIG. 7a is a flow diagram of L1-TII RN operations in DL HARQ operation.
FIG. 7b is a flow diagram of L1-TII RN operations in UL HARQ operation.

FIG. 7a illustrates a flow diagram of L1-TII RN operations 700 in DL HARQ operation. L1-TII RN operations 700 may be indicative of operations taking place in an L1-TII RN, such as L1-TII RN 400, as the L1-TII RN serves with an eNB and UEs. L1-TII RN operations 700 may occur while the L1-TII RN is in normal operating mode and the eNB has at least one UE that it is serving and the UE has data to transmit to the eNB.

L1-TII RN operations 700 may begin with the L1-TII RN receiving a transmission from the eNB regarding an upcoming transmission that the eNB is scheduling for a UE (block 705). The transmission from the eNB may include information such as scheduling information, allocated transmission resource, UE identification, as well as the data that the eNB will be transmitting to the UE. The transmission from the eNB may further include information on whether the UE should use CRS or DRS as the demodulation reference signal when receiving the data. L1-TII RN may use this information to determine whether the coefficient should be applied in the frequency domain to those transmit symbols that carry the data or not. The L1-TII RN may respond to the transmission from the eNB with either an ACK or a NACK based on the ability of the L1-TII RN to decode the transmission (block 710). For example, if the L1-TII RN was not able to decode the transmission from the eNB, then the L1-TII RN may transmit a NACK back to the eNB, while the L1-TII RN may transmit an ACK to the eNB if it was able to successfully decode the transmission from the eNB.

A period of time may elapse between the L1-TII RN receiving the transmission from the eNB and the L1-TII RN responding with either an ACK or a NACK. Due to the dual nature of the L1-TII RN not all functionality of the L1-TII RN is available at all times, for example, when the L1 repeater DL component of the L1-TII RN is ON, the TII relay may be able to receive DL transmissions from the eNB but may not be able to transmit DL transmissions to the UE, similarly, with the L1 repeater UL component of the L1-TII RN is OFF, the L1 repeater cannot forward UL signals to the eNB but the TII relay can transmit UL transmissions to the eNB but cannot receive UL transmissions from the UE. Therefore, the L1-TII RN may need to wait for defined periods of time before it may be able to complete specific operations. As shown in FIG. 7a, the L1-TII RN alternates between L1 repeater ON and OFF each subframe or a two subframe period. However, the L1-TII RN may alternate between L1 repeater ON and OFF with a different period, a different ON/OFF pattern, a pseudorandom pattern, no regular pattern at all, a period based on a time constraint specified by a technical standard, and so forth.

The L1-TII RN may optionally apply a coefficient based on an estimate of a channel between the eNB and the L1-TII RN to the data in the frequency domain (block 715). The application of the coefficient to the data may lead the UE to believe that the data is coming from the eNB rather than from the L1-TII RN and may be useful when transmitting to legacy UEs. When transmitting to non-legacy UEs, the L1-TII RN may not apply the coefficient to the data, thereby allowing the non-legacy UE to use spatial multiplexing to improve performance.

The L1-TII RN may then transmit the data received from the eNB to the UE at the allocated transmission resource (block 720). With the transmission from the L1-TII RN occurring at the allocated transmission resource, the transmission from the L1-TII RN may appear to the UE as having originated from the eNB rather than the L1-TII RN. The transmission from the L1-TII RN may occur in conjunction with a transmission from the eNB, wherein the transmission from the eNB may or may not contain a duplicate of the data transmitted by the L1-TII RN. L1-TII RN operations 700 may then terminate.

FIG. 7b illustrates a flow diagram of L1-TII RN operations 750 in UL HARQ operation. L1-TII RN operations 750 may be indicative of operations taking place in an L1-TII RN, such as L1-TII RN 400, as the L1-TII RN serves with an eNB and UEs. L1-TII RN operations 750 may occur while the L1-TII RN is in normal operating mode and the eNB has at least one UE that it is serving and the UE has data to transmit to the eNB.

L1-TII RN operations 750 may begin with the L1-TII RN receiving a transmission from the eNB regarding a transmission resource that the eNB has allocated to a UE (block 755). The transmission may include information such as scheduling information as well as the UE's identification. The L1-TII RN may then receive and decode a transmission made by the UE at the allocated transmission resource (block 760). Depending on its ability to decode the transmission, the L1-TII RN may transmit either an ACK or a NACK to the eNB, with the ACK indicating that it was able to decode the transmission and the NACK indicating that it was not able to decode the transmission (block 765).

If both the eNB and the L1-TII RN were not able to decode the transmission from the UE, i.e., a retransmission is required (block 770) then the L1-TII RN may need to return to block 760 to receive and decode another transmission from the UE. Since HARQ retransmissions in the UL are synchronous in nature, the L1-TII RN and the eNB know when the UE will retransmit.

If a retransmission is not required (block 770), then the L1-TII RN may perform a check to determine if it has received a transmission from the eNB containing scheduling information regarding a transmission that the L1-TII RN is to make to the eNB to transmit data contained in the transmission made by the UE to the eNB (block 775). The L1-TII RN may only receive such a transmission from the eNB if the eNB was not able to successfully decode the transmission from the UE but the L1-TII RN was able to decode the transmission. If the L1-TII RN did not receive such a transmission from the eNB, then L1-TII RN operations 750 may then terminate. If the L1-TII RN did receive such a transmission from the eNB, then at an allocated transmission resource specified in the transmission, the L1-TII RN may transmit the data to the eNB (block 780) and L1-TII RN operations 750 may then terminate.

Figure 8A:
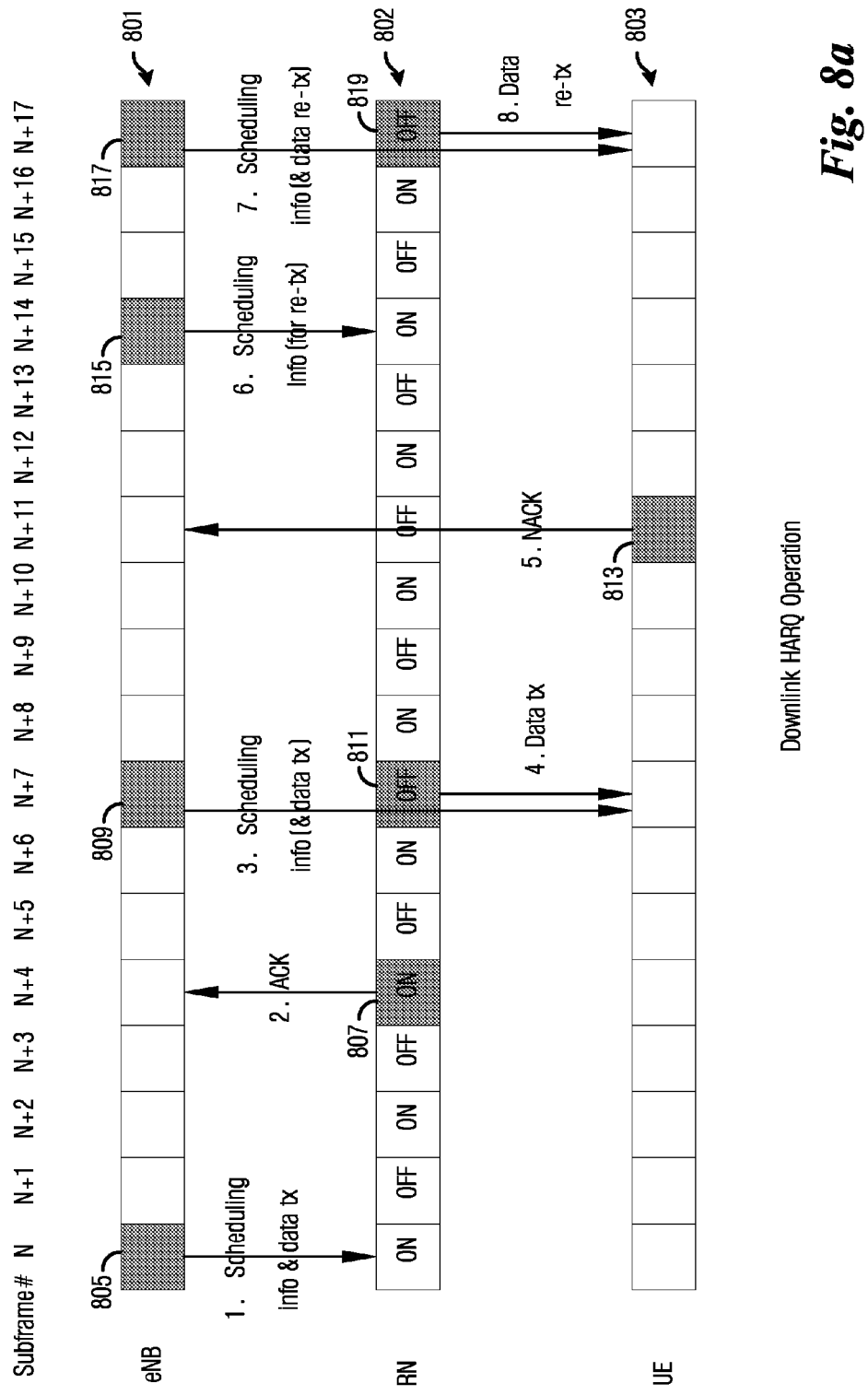
FIG. 8a is a diagram of a sequence of subframes at an eNB, an L1-TII RN, and a UE involved in DL HARQ operation.

FIG. 8a illustrates a sequence of subframes at an eNB, an L1-TII RN, and a UE involved in DL HARQ operation. As shown in FIG. 8a, a first sequence of subframes 801 represents subframes from an eNB, a second sequence of subframes 802 represents subframes from an L1-TII RN, and a third sequence of subframes 803 represents subframes from a UE. Subframes in second sequence of subframes 802 also include a notation of either ON or OFF, indicating the L1-TII RN's L1 repeater DL mode (ON or OFF).

As discussed previously, when the L1 repeater DL of the L1-TII RN is ON, the L1 repeater forwards DL signals to the UE and the TII relay can receive from the eNB but cannot transmit to the UE on the DL. Additionally, the L1-TII RN's L1 repeater UL is OFF during the same time, the L1 repeater does not forward UL signals to the eNB and the TII relay can transmit to the eNB but cannot receive from the UE. Similarly, when the L1 repeater DL of the L1-TII RN is OFF, the L1 repeater does not forward DL signals to the UE and the TII relay can transmit to the UE but cannot receive from the eNB on the DL. Furthermore, the L1-TII RN's L1 repeater UL is ON during the same time, the L1 repeater forwards UL signals to the eNB and the TII relay can receive from the UE but cannot transmit to the eNB.

At subframe N (shown as subframe 805), the eNB may notify the L1-TII RN of an impending transmission to the UE by sending a transmission addressed to the L1-TII RN. The transmission includes scheduling information regarding the eNB's intended transmission to the UE as well as the data that the eNB is going to transmit to the UE. The transmission may also include the UE's identifier so that the L1-TII RN may be able to later identify a transmission made to the UE. At subframe N+4 (shown as subframe 807) the L1-TII RN transmits either an ACK or a NACK to the eNB to indicate its ability to decode the transmission made at subframe N.

For discussion purposes, assume that the L1-TII RN was able to successfully decode the transmission made at subframe N. Then, at subframe N+7 (shown as subframe 809) the eNB transmits to the UE. The transmission at subframe N+7 may contain scheduling information and may or may not contain data. According to an embodiment, if the transmission uses CRS mode, then the transmission may contain data, while if the transmission uses DRS mode, then the transmission may not contain data.

According to an alternative embodiment, when TII relay processing of the L1-TII RN is slow, the scheduling information included in the transmission made at subframe N+7 is also included in the transmission made at subframe N. In yet another alternative embodiment, when TII relay processing of the L1-TII RN is fast, the L1-TII RN may make use of the UE's identifier to intercept the transmission made at subframe N+7 when the L1-TII RN's L1 repeater amplifies-and-forwards the DL signals in subframe N+7's control zone.

Also at subframe N+7 (shown as subframe 811) the L1-TII RN transmits to the UE, the transmission containing the data provided by the eNB in the transmission made during subframe N. The transmission made by the L1-TII RN may be made at the transmission resources as specified by the eNB so that to the UE, the transmission made by the L1-TII RN appears to have been made by the eNB. The transmission made by the L1-TII RN may include the application of the coefficient, in the frequency domain, based on an estimate of a channel between the eNB and the L1-TII RN to make it appear that the transmission originated at the eNB. According to an embodiment, if the UE is not a legacy UE, then both the transmission from the eNB and the L1-TII RN may contain data to allow the UE to utilize spatial multiplexing to improve performance.

At subframe N+11 (shown as subframe 813), the UE transmits either an ACK or a NACK to the eNB based on its ability to decode the transmission made at subframe N+7. For discussion purposes, assume that the UE was not able to successfully decode the transmission transmitted at subframe N+7 and transmits a NACK to the UE. The L1-TII RN's L1 repeater may also amplify-and-forward the transmission made at subframe N+11 to the eNB. At subframe N+14 (shown as subframe 815) the eNB transmits scheduling information for a retransmission to the L1-TII RN. Since this is a retransmission, the eNB may not need to retransmit the data to the L1-TII RN. The subframe N+14 transmission made by the eNB may be an optional transmission for an L1-TII RN with slow TII relay processing, i.e., if the TII relay processing of the L1-TII RN is fast, then the L1-TII RN may be able to intercept the retransmission attempt by the eNB without being specifically instructed to do so.

At subframe N+17 (shown as subframe 817), the eNB transmits to the UE scheduling information regarding the retransmission. The transmission at subframe N+17 from the eNB may also contain the data being retransmitted. Also at subframe N+17 (shown as subframe 819) the L1-TII RN retransmits the data to the UE. As discussed previously, the transmission made by the L1-TII RN may be made at the transmission resources as specified by the eNB so that to the UE, the transmission made by the L1-TII RN appears to have been made by the eNB. The transmission made by the L1-TII RN may include the application of the coefficient to the transmit symbols in the frequency domain based on an estimate of a channel between the eNB and the L1-TII RN including the path between receiver 405 and transmitter 440 and through amplifier 410 to make it appear that the transmission originated at the eNB. According to an embodiment, if the UE is not a legacy UE, then both the transmission from the eNB and the L1-TII RN may contain data to allow the UE to utilize spatial multiplexing to improve performance.

Figure 8B:
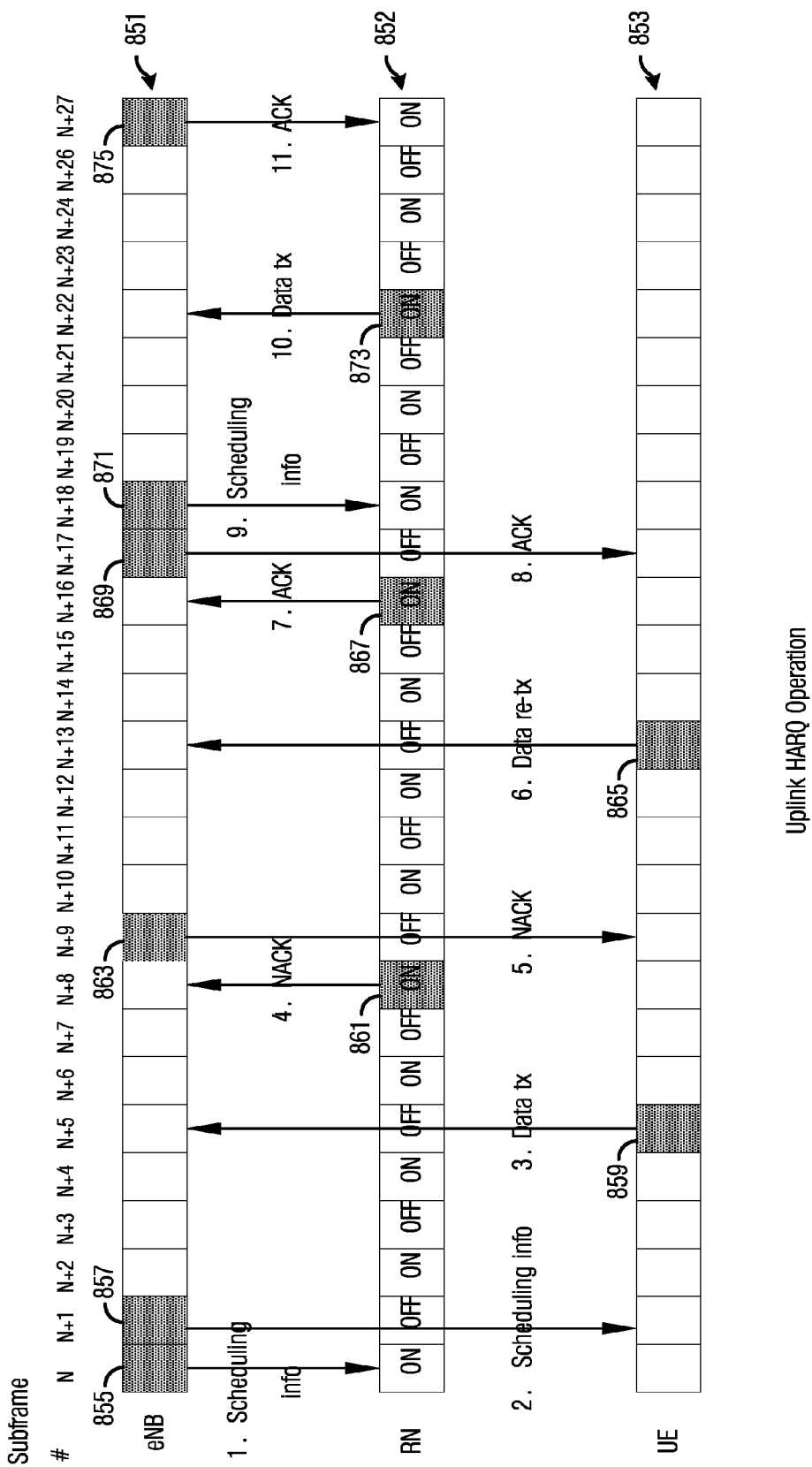
FIG. 8b is a diagram of a sequence of subframes at an eNB, an L1-TII RN, and a UE involved in UL HARQ operation.

FIG. 8b illustrates a sequence of subframes at an eNB, an L1-TII RN, and a UE involved in UL HARQ operation. As shown in FIG. 8b, a first sequence of subframes 851 represents subframes from an eNB, a second sequence of subframes 852 represents subframes from an L1-TII RN, and a third sequence of subframes 853 represents subframes from a UE. Subframes in second sequence of subframes 852 also include a notation of either ON or OFF, indicating the L1-TII RN's L1 repeater DL mode (ON or OFF).

As discussed previously, when the L1 repeater DL of the L1-TII RN is ON, the L1 repeater forwards DL signals to the UE and the TII relay can receive from the eNB but cannot transmit to the UE on the DL. Additionally, the L1-TII RN's L1 repeater UL is OFF during the same time, the L1 repeater does not forward UL signals to the eNB and the TII relay can transmit to the eNB but cannot receive from the UE. Similarly, when the L1 repeater DL of the L1-TII RN is OFF, the L1 repeater does not forward DL signals to the UE and the TII relay can transmit to the UE but cannot receive from the eNB on the DL. Furthermore, the L1-TII RN's L1 repeater UL is ON during the same time, the L1 repeater forwards UL signals to the eNB and the TII relay can receive from the UE but cannot transmit to the eNB.

At subframe N (shown as subframe 855) the eNB transmits scheduling information to the L1-TII RN, the scheduling information includes information about a grant allowing the UE to transmit at a specific transmission resource. The scheduling information also includes the UE's identifier, allowing the L1-TII RN to detect transmissions to and from the UE. At subframe N+1 (shown as subframe 857) the eNB transmits scheduling information to the UE, the scheduling information includes the UE's identification, and information regarding the allocated transmission resource. Knowing the UE's identification, if the L1-TII RN has fast TII relay processing, the L1-TII RN may intercept the transmission at subframe N+1 and intercept scheduling information included in the transmission. If the L1-TII RN has slow TII relay processing, the L1-TII RN may obtain the scheduling information transmitted in the transmission at subframe N.

At subframe N+5 (shown as subframe 859) the UE may transmit data to the eNB. The L1 repeater of the L1-TII RN may amplify-and-forward the transmission to the eNB, while the TII relay of the L1-TII RN may attempt to decode the transmission. At subframe N+8 (shown as subframe 861), the L1-TII RN may transmit either an ACK or a NACK to the eNB based on its ability to decode the transmission. For discussion purposes, assume that the L1-TII RN was not able to decode the transmission, therefore, the transmission at subframe N+8 contains a NACK.

At subframe N+9 (shown as subframe 863) the eNB may send either an ACK or a NACK to the UE based on both the eNB's and the L1-TII RN's ability to decode the transmission at subframe N+5. If both the eNB and the L1-TII RN fail to decode the transmission from the UE at subframe N+5, then the eNB sends a NACK to the UE, while if either of the two were able to successfully decode the transmission, the eNB sends an ACK to the UE. For discussion purposes, assume that neither the eNB nor the L1-TII RN were able to decode the transmission from the UE at subframe N+5, therefore the transmission at subframe N+9 contains a NACK.

At subframe N+13 (shown as subframe 865) the UE retransmits the data to the eNB. The L1 repeater of the L1-TII RN may amplify-and-forward the transmission to the eNB, while the TII relay of the L1-TII RN may attempt to decode the transmission. At subframe N+16 (shown as subframe 867), the L1-TII RN may transmit either an ACK or a NACK to the eNB based on its ability to decode the transmission. For discussion purposes, assume that the L1-TII RN was able to decode the transmission, therefore, the transmission at subframe N+16 contains an ACK.

At subframe N+17 (shown as subframe 869) the eNB may send either an ACK or a NACK to the UE based on both the eNB's and the L1-TII RN's ability to decode the transmission at subframe N+13. If both the eNB and the L1-TII RN fail to decode the transmission from the UE at subframe N+13, then the eNB sends a NACK to the UE, while if either of the two were able to successfully decode the transmission, the eNB sends an ACK to the UE. For discussion purposes, assume that the L1-TII RN was able to decode the transmission from the UE at subframe N+13, therefore the transmission at subframe N+17 contains an ACK.

If the eNB was also able to decode the transmission from the UE at subframe N+13, then the transmissions are complete. However, if the eNB was not able to decode the transmission from the UE at subframe N+13, then the eNB may need to retrieve the information contained in the transmission from the UE at subframe N+13 from the L1-TII RN. At subframe N+18 (shown as subframe 871) the eNB may send a transmission to the L1-TII RN, the transmission containing scheduling information for the L1-TII RN to forward the data contained in the transmission from the UE at subframe N+13 to the eNB. At subframe N+22 (shown as subframe 873) the L1-TII RN may transmit the data contained in the transmission from the UE at subframe N+13 to the eNB and at subframe N+27 (shown as subframe 875) the eNB may send either an ACK or a NACK to the L1-TII RN based on the eNB's ability to decode the transmission made by the L1-TII RN to the eNB at subframe N+23. For discussion purposes, assume that the eNB was able to decode the transmission made by the L1-TII RN to the eNB at subframe N+23, therefore, the transmission to the L1-TII RN made at subframe N+27 contains an ACK.

Assisting DL HARQ transmissions with a TII relay may encounter a timing problem with transmission of ACK/NACK transmissions. For example, L1 repeater UL reception is ON when TII relay DL transmission occurs, but is OFF when a UE responds with an ACK/NACK transmission. Additionally, due to a technical standard specified 4 ms delay for legacy UE ACK/NACK transmission, the ACK/NACK transmission may only be heard directly by the eNB. Also, TII relay DL HARQ termination relies indirectly on the eNB rather than directly from the UE and TII DL relay retransmission may not be able to maintain legacy timing requirements (e.g., 4 ms). The timing difficulties may lead to a new UE ACK/NACK timing with an 8 ms delay instead of 4 ms, resulting in a second TII relay HARQ transmission with a 16 ms delay. Therefore, target HARQ retransmissions need to be halved compared to a direct connection without TII relay assistance.

However, it may be possible to maintain legacy HARQ timing for both DL and UL HARQ transmissions without having the eNB prepare the L1-TII RN for DL or UL transmissions.

Figure 9:
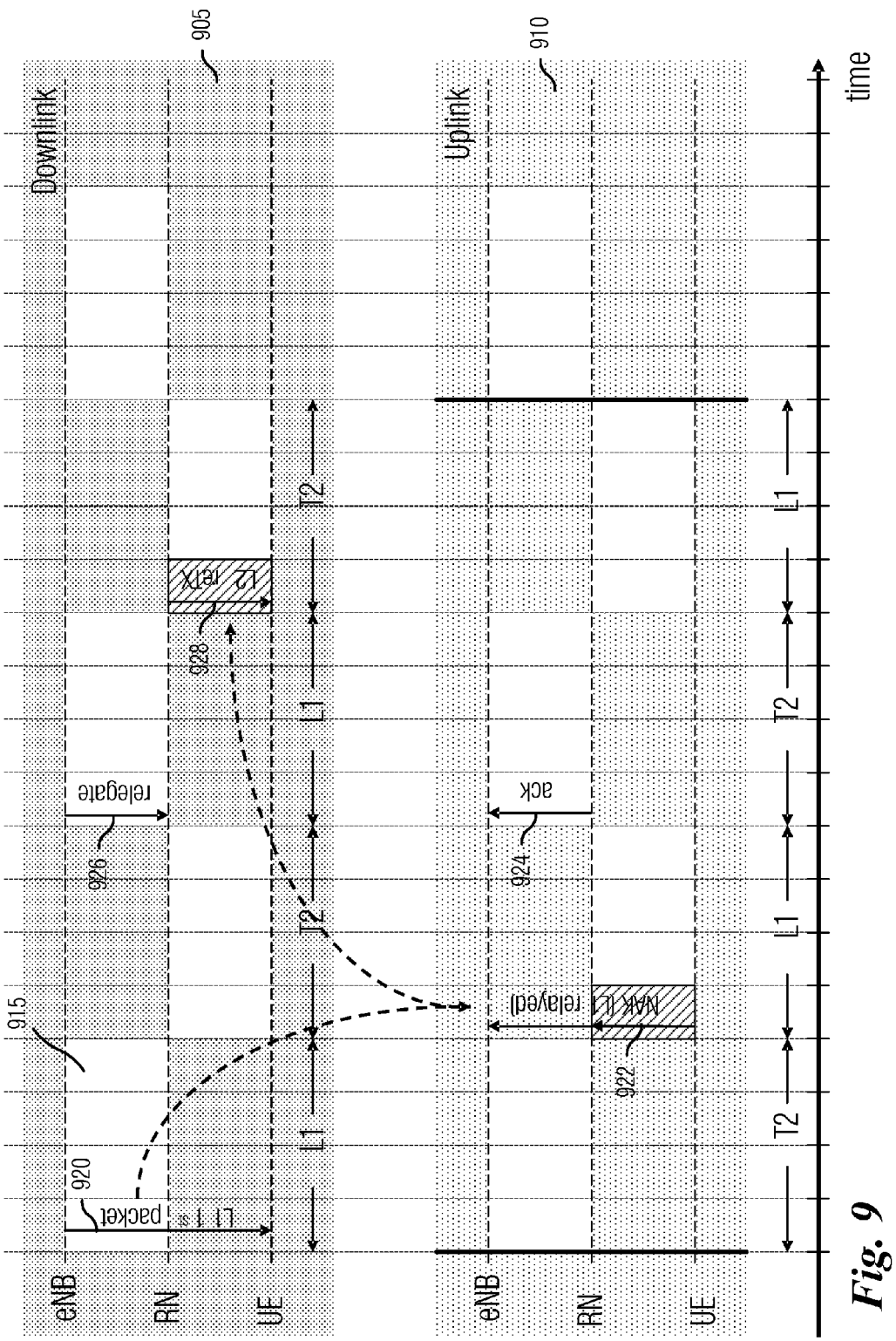
FIG. 9 is a diagram of DL and UL transmissions by network components for L1-TII RN assisted DL HARQ transmissions.

FIG. 9 illustrates DL and UL transmissions by network components for L1-TII RN assisted DL HARQ transmissions. As shown in FIG. 9, DL transmissions are shown in a top shaded area 905 and UL transmissions are shown in a bottom shaded area 910. Within either DL transmissions area 905 or UL transmissions area 910, unshaded boxes, such as unshaded box 915, indicate active links between respective network components. For example, unshaded box 915 indicates that a link between an eNB and a L1-TII RN is active (ON). A horizontal axis represents increasing time with a single subframe resolution.

The eNB transmits an initial packet of the DL HARQ session (shown as event 920). The initial packet may be amplified-and-forwarded by a L1 repeater of the L1-TII RN. At the same time, a TII relay of the L1-TII RN is also down-converting, decoding, and storing the initial packet. After a period of time, for example, 4 ms, the UE transmits an UL ACK/NACK response (shown as event 922) depending on its ability to decode the initial packet. At the same time, the TII relay turns ON its UL receive mode, therefore, both directions between the eNB and the UE may be enhanced by the operation of the L1 repeater of the L1-TII RN.

After another period of time, for example, 4 ms, when the TII relay turns ON its UL transmit mode, suppose that the UE negatively acknowledges the initial packet at event 922 but the L1-TII RN successfully decodes the initial packet, the L1-TII RN may send an ACK a total of 8 ms after the initial packet transmission to the eNB (shown as event 924). Along with the ACK, the L1-TII RN may include resource blocks (transmission resources) and formats it may allocate for a TII relay retransmission.

In the meantime, the eNB may send an optional message to relegate any remaining DL HARQ session to the L1-TII RN (shown as event 926). After another period of time, for example, 4 ms, or a total of 12 ms after the transmission of the initial packet, the HARQ retransmission is sent by the L1-TII RN with optimized beamforming, possibly in a different format and resource blocks (shown as event 928).

Although the discussion of FIG. 9 focuses on 4 ms periods of time, the embodiments may be operable for periods of time of different durations. Therefore, the illustrative example of 4 ms should not be construed as being limiting to either the scope or the spirit of the embodiments.

With L1-TII RN assisted UL HARQ transmissions, L1 repeater and TII relay transmissions may be alternating in time, where the L1 repeater is ON during TII relay receiving and the L1 repeater is OFF during TII relay transmitting. The L1-TII RN may act as an external antenna space as well as a HARQ buffer for UEs. A link between the L1-TII RN and the eNB may form a fixed beam for UL interference reduction.

For L1-TII RN assisted UL HARQ transmissions, a PDCCH action time may be equal to a PHICH time (e.g., 4 subframes). Additional timing requirements may include: a DL half-duplex period for the L1 repeater may need to be aligned with DL signaling (e.g., 4 subframes from an UL subframe of interest), and an ACK/NACK from the L1 repeater to the eNB may be assumed to be in synchrony with an ACK/NACK from the eNB to the UE. A delay in relegating HARQ sessions from the eNB to the L1-TII RN may introduce a subframe-dependent Layer two retransmission delay. For example, if the relegation delay is less than or equal to 2 subframes, the Layer two retransmission delay may become non-uniform. While, if the relegation delay is delayed until an eighth subframe after an ACK/NACK subframe (for example, if the ACK/NACK subframe occurs at subframe N, the relegation occurs at subframe N+8), all Layer two retransmissions are delayed by 4 ms compared to an unassisted HARQ transmission and the Layer two retransmission delays become uniform.

Figure 10A:
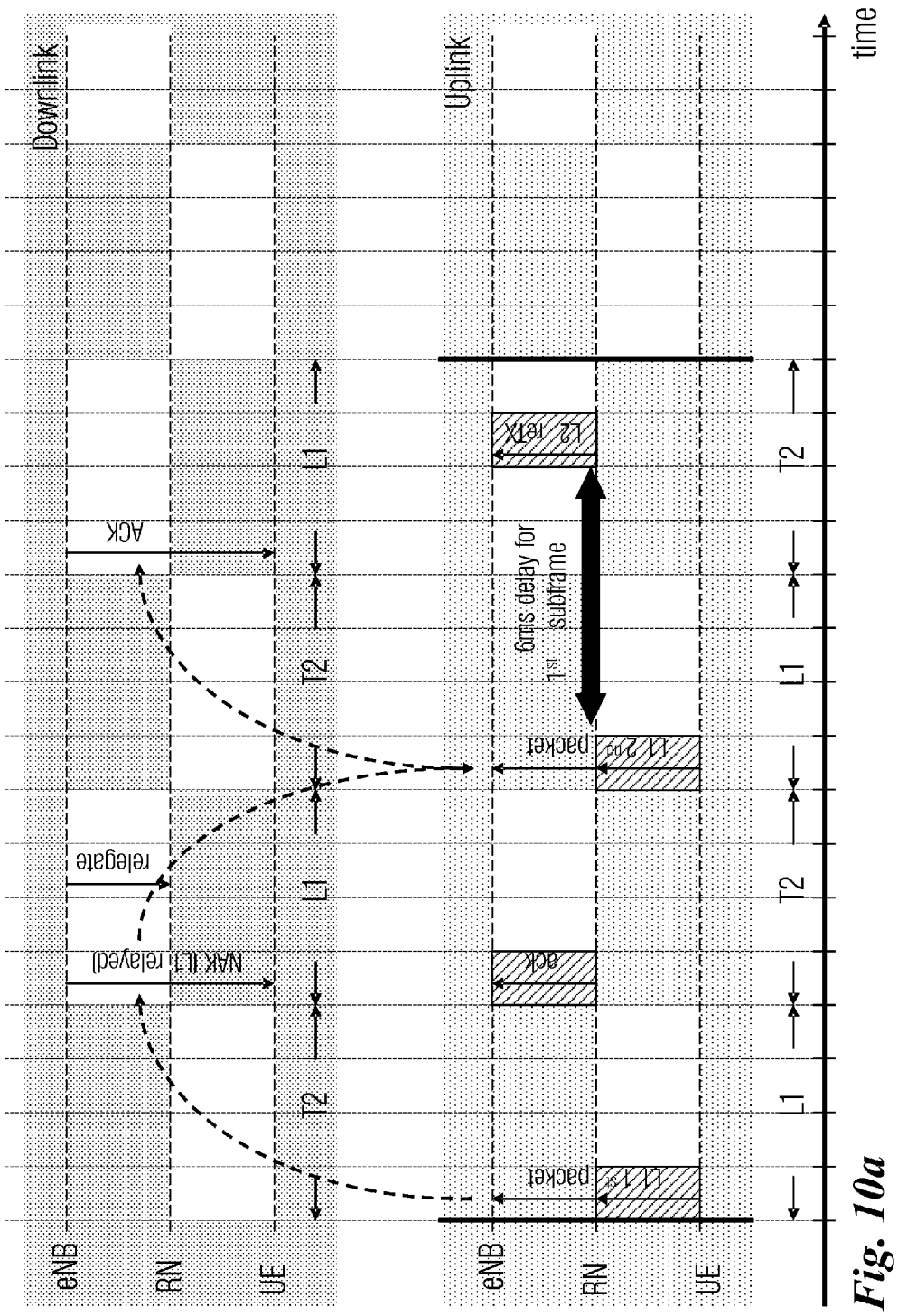
FIGS. 10a and 10b are diagrams of DL and UL transmissions by network components for L1-TII RN assisted UL HARQ transmissions with non-uniform Layer two retransmission timing.
Figure 10B:
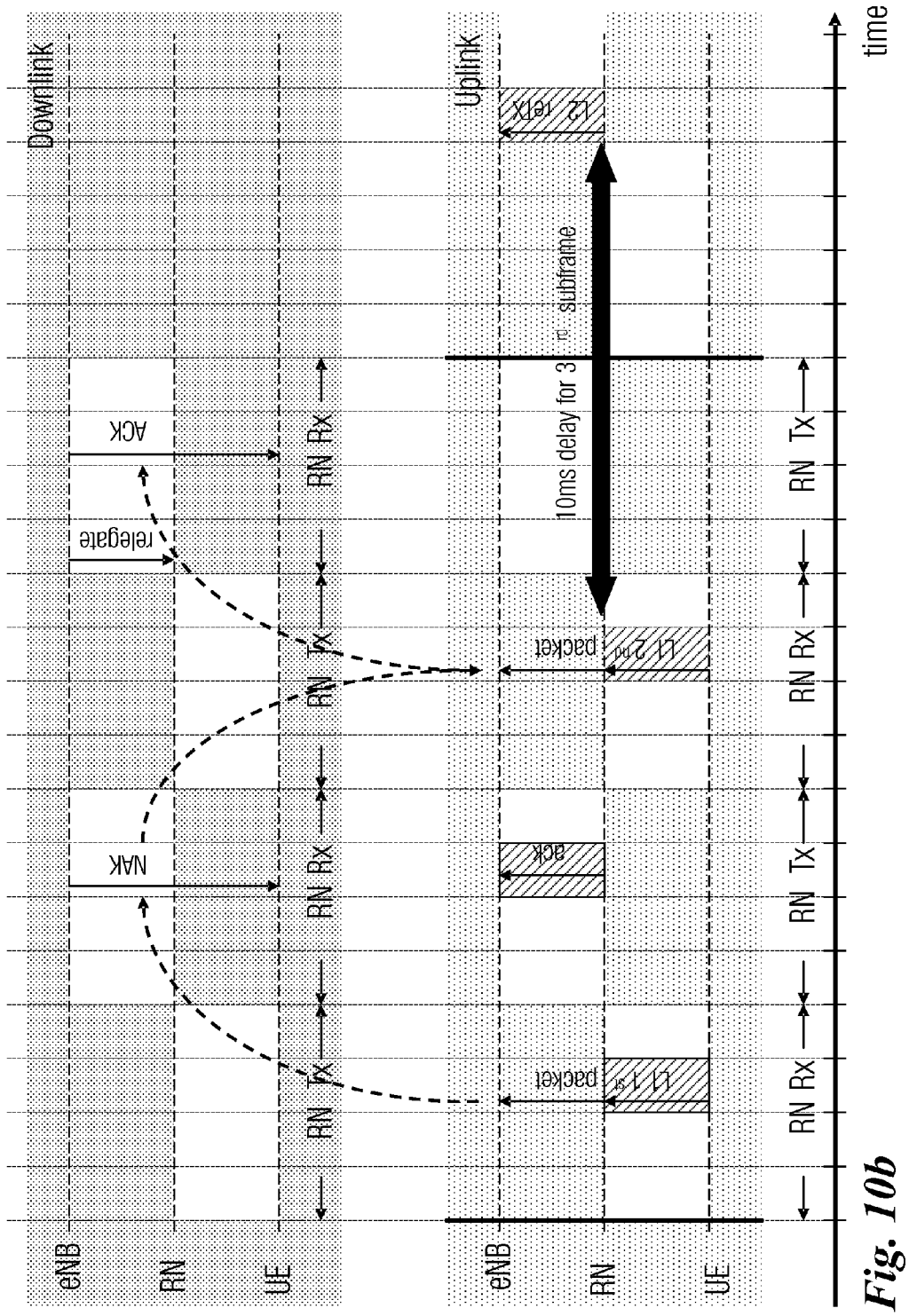

FIGS. 10a and 10b illustrate DL and UL transmissions by network components for L1-TII RN assisted UL HARQ transmissions with non-uniform Layer two retransmission timing. FIG. 10a illustrates that with a relegating of an HARQ session from the eNB to the L1-TII RN occurring two subframes (2 ms) after an ACK/NACK from the eNB, a Layer two retransmission may be delayed by six subframes (6 ms), while FIG. 10b illustrates that with a relegating of an HARQ session from the eNB to the L1-TII RN occurring six subframes (6 ms) after an ACK/NACK from the eNB, a Layer two retransmission may be delayed by 10 subframes (10 ms).

Figure 11A:
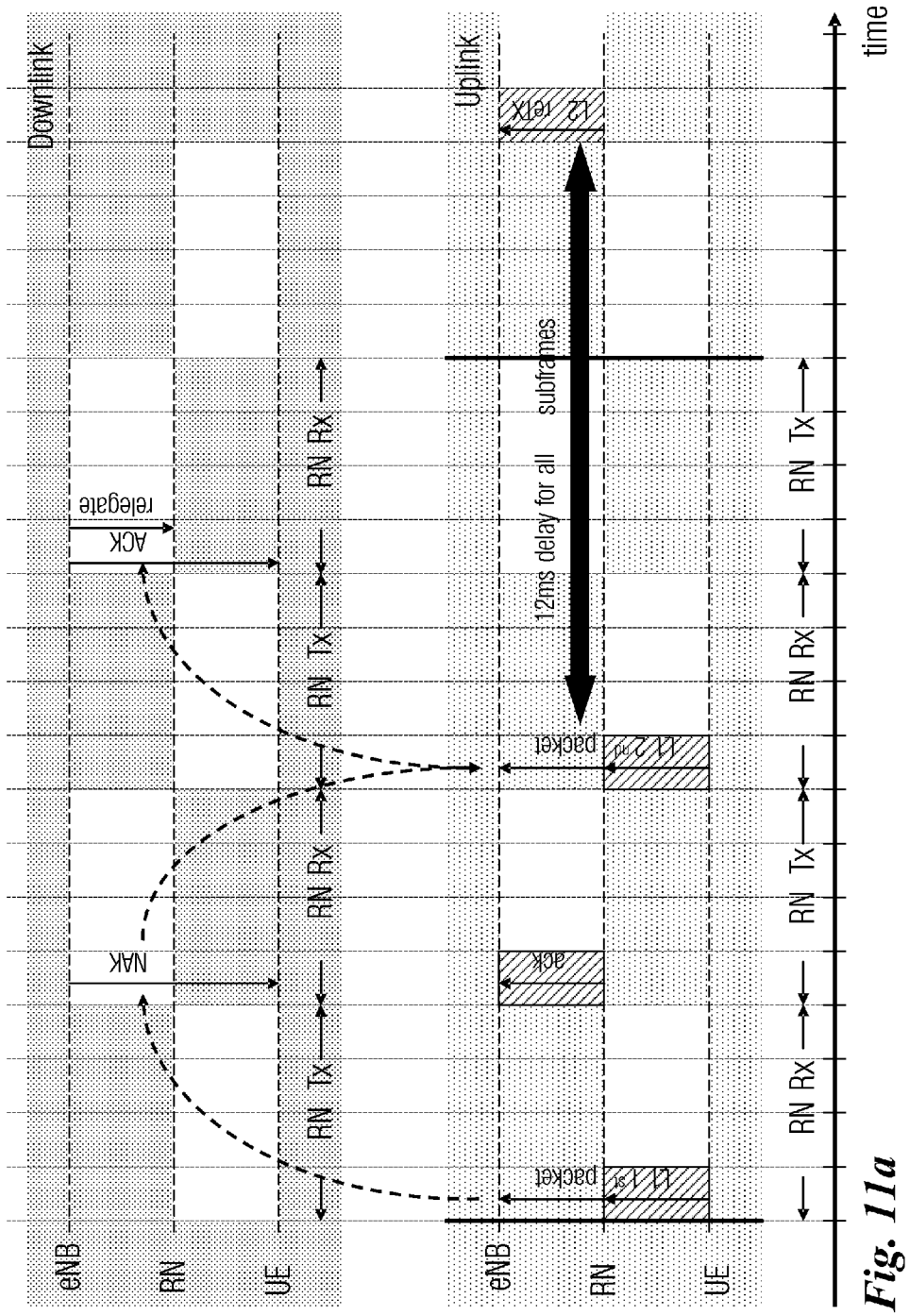
FIGS. 11a and 11b are diagrams of DL and UL transmissions by network components for L1-TII RN assisted UL HARQ transmissions with uniform Layer two retransmission timing.
Figure 11B:
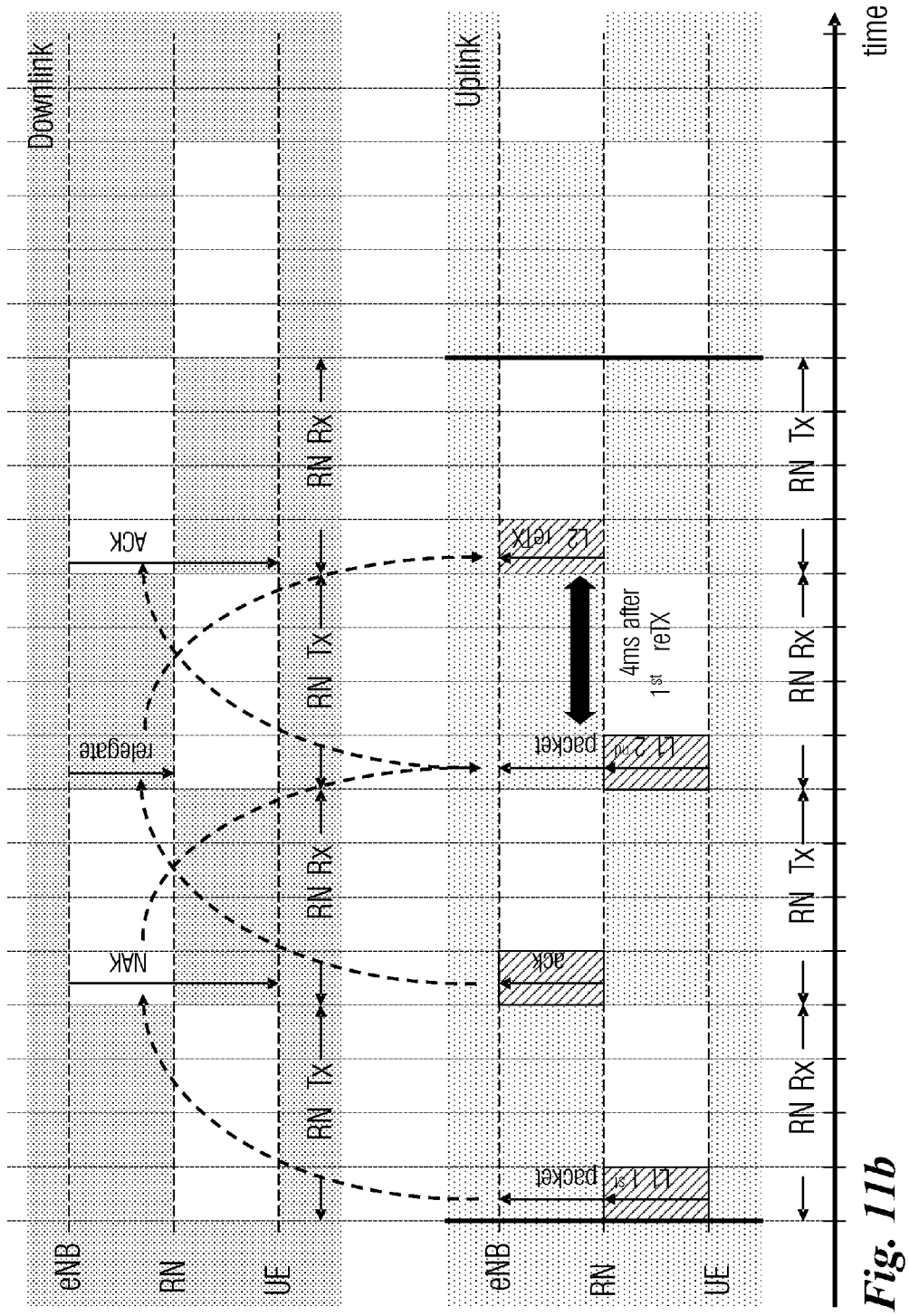

FIGS. 11a and 11b illustrate DL and UL transmissions by network components for L1-TII RN assisted UL HARQ transmissions with uniform Layer two retransmission timing. FIG. 11a illustrates that with a relegating of an HARQ session from the eNB to the L1-TII RN occurring in the same subframe as an ACK/NACK from the eNB, a Layer two retransmission may be delayed by 12 subframes (12 ms).

As shown in FIG. 11b, an UL initial packet may be sent from the UE to the eNB during a L1 repeater ON operation. Assuming that the eNB fails to receive (decode) the UL initial packet but the L1-TII RN successfully decodes the UL initial packet, then a NACK may be sent from the eNB 4 ms later and an ACK is sent from the L1-TII RN to the eNB. After another 4 ms, the HARQ retransmission via the L1 repeater is sent from the UE to the eNB. Meanwhile, after receiving the ACK from the L1-TII RN, the eNB may send a relegation message to notify the L1-TII RN to continue the HARQ session via a Layer two retransmission.

Although the relegation message was sent during a DL TII relay transmitting subframe, the L1 repeater is still on for a first few transmission resources (i.e., the control zone) that carry the PHICH. Therefore, if the relegation message is delivered via PHICH to the L1-TII RN, the L1-TII RN may be capable of receiving the relegation message and start the Layer two retransmission after 4 ms.

As discussed previously, the Layer two retransmission may occur at 4 ms after the relegation message and the eNB may send an ACK to the UE regardless of a result of the decoding of the L1 repeater HARQ retransmission. The TII relay then takes over the HARQ session until the eNB successfully receives (decodes) the UL initial packet.

Figure 12A:
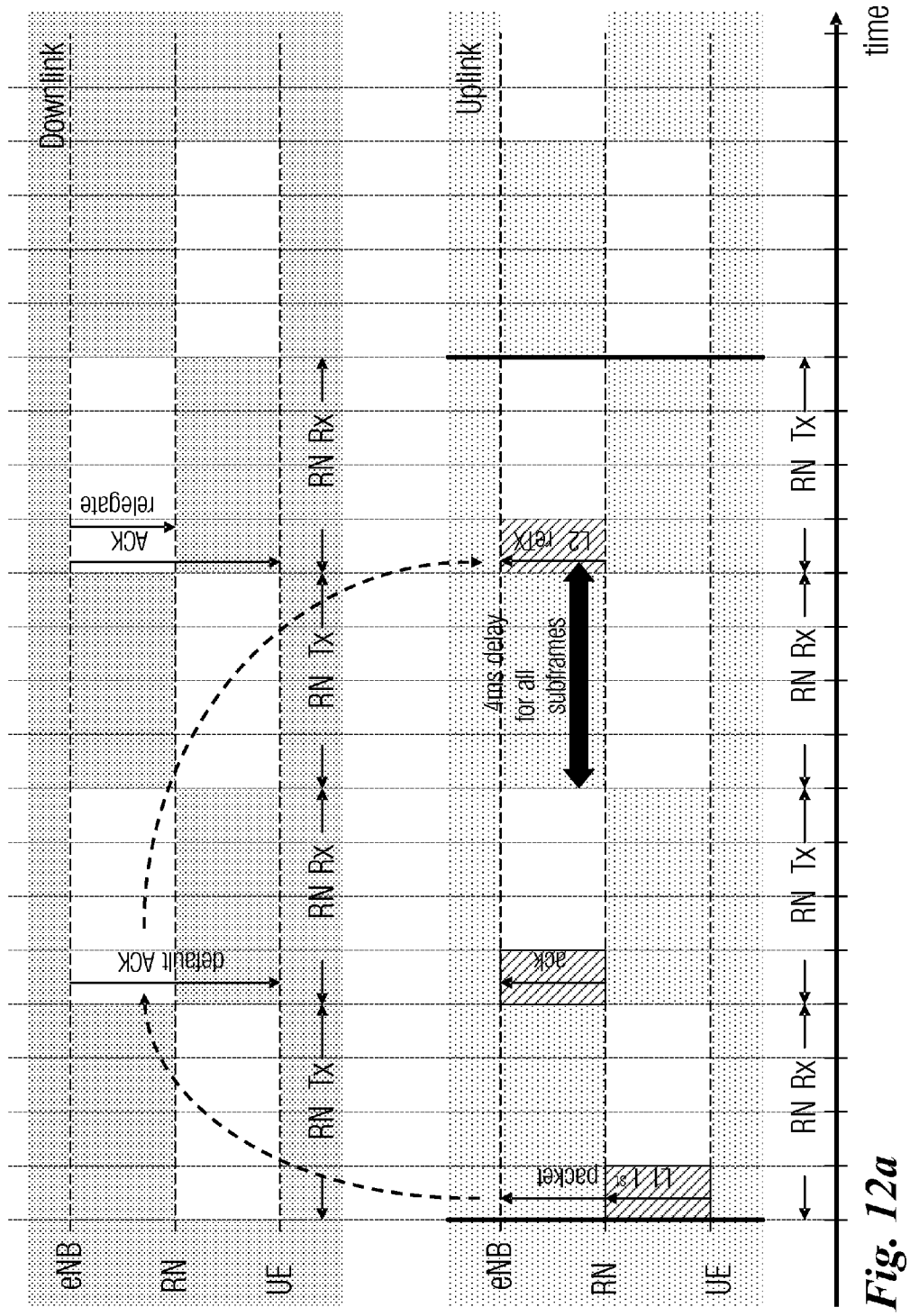
FIGS. 12a through 12c are diagrams of DL and UL transmissions by network components for L1-TII RN assisted UL HARQ transmissions with reduced delay.
Figure 12B:
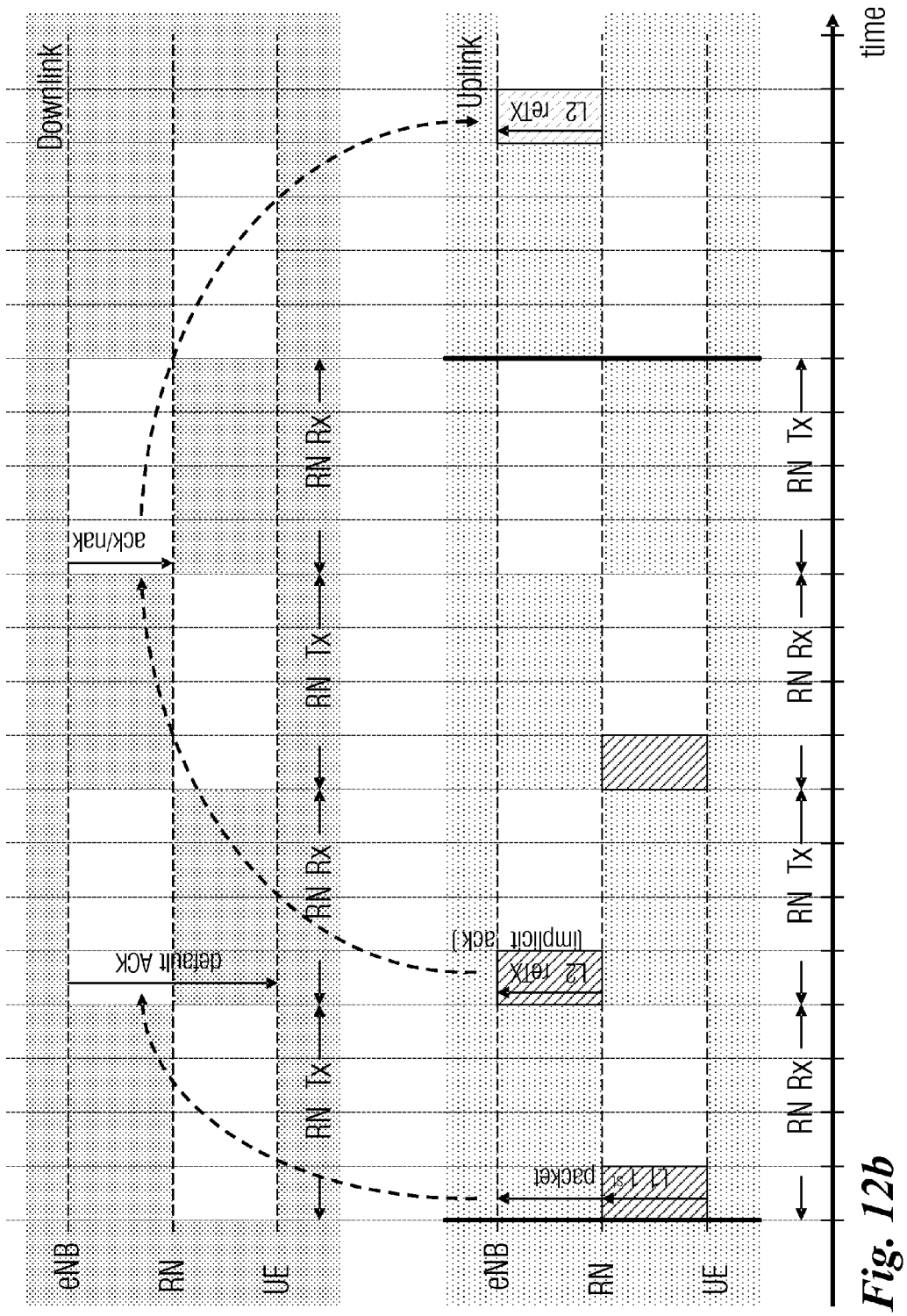
Figure 12C:
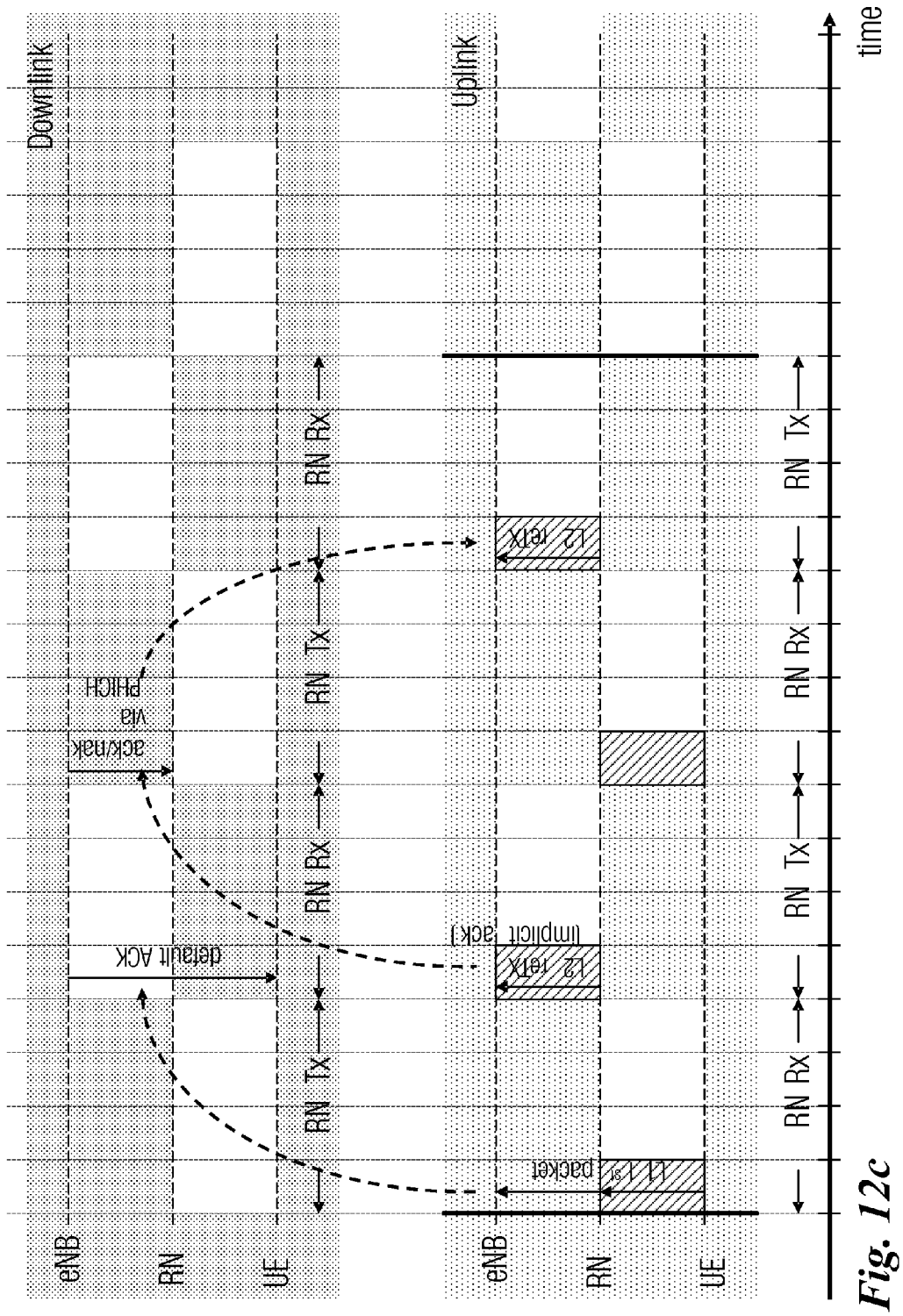

FIGS. 12a through 12c illustrate DL and UL transmissions by network components for L1-TII RN assisted UL HARQ transmissions with reduced delay. The Layer two retransmission delay (as shown in FIGS. 10a, 10b, 11a, and 11b) may be reduced by having the eNB sending a default ACK after each L1 initial packet received, and the L1-TII RN starting a second subpacket transmission at the same time as the default eNB ACK. With the use of the default ACK and the transmission of the second subpacket, a L1-TII RN to eNB UL HARQ cycle may be maintained at 4 ms since the L1 repeater is ON for the PHICH (the L1-TII RN may listen to DL control signals even in TII relay transmission subframes), otherwise the L1-TII RN to eNB UL HARQ cycle may increase to 8 ms due to half duplex operation.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for combined relay node operation, the method comprising:
    determining, by a combined relay node, an operating mode of the combined relay node, wherein the combined relay node comprises a repeater and a relay;
    when the operating mode is repeater on mode,
        receiving first wireless signals,
        amplifying and forwarding the received first wireless signals, and
        storing subframes, wherein the subframes are demodulated and decoded versions of the received first wireless signals; and
    when the operating mode is repeater non-transmitting mode,
        receiving second wireless signals,
        amplifying and forwarding a control zone of the received second wireless signals, and
        transmitting the subframes that previously were stored while the operating mode was repeater on mode.

2. The method of claim 1, wherein amplifying and forwarding the received first wireless signals comprises:
    amplifying the received first wireless signals; and
    transmitting the amplified received first wireless signals,
    wherein the received first wireless signals are amplified and transmitted without being demodulated and decoded.

3. The method of claim 2, wherein amplifying and forwarding the control zone comprises amplifying and forwarding a portion of the received second wireless signals.

4. The method of claim 3, wherein the control zone comprises at least one transmission resource of each subframe contained in the received second wireless signals.

5. The method of claim 1, wherein storing the subframes occurs in the relay.

6. The method of claim 1, wherein amplifying and forwarding the control zone comprises amplifying and forwarding a portion of the received second wireless signals.

7. The method of claim 6, wherein the control zone comprises at least one transmission resource of each subframe contained in the received second wireless signals.

8. The method of claim 1, wherein determining the operating mode comprises receiving an instruction specifying the operating mode.

9. The method of claim 1, wherein determining the operating mode comprises alternating the operating mode at an expiration of a timer.

10. A relay node comprising:
    a receiver configured to wirelessly receive signals;
    a repeater coupled to the receiver, the repeater configured to amplify and forward at least a first portion of the received signals; and
    a relay coupled to the receiver, the relay configured to demodulate and decode at least a second portion the received signals, to store the demodulated and decoded signals, and to transmit at least a portion the demodulated and decoded signals,
    wherein the repeater is configured to be in a non-transmitting mode when the relay transmits, wherein the relay is configured to store the demodulated and decoded signals when the repeater transmits, and wherein, when the repeater is in the non-transmitting mode, the relay is configured to amplify and forward a control zone of the received signals during the repeater non-transmitting mode, and to transmit the demodulated and decoded signals that previously were stored while the repeater was transmitting.

11. The relay node of claim 10, wherein the repeater comprises:

an amplifier coupled to the receiver, the amplifier configured to amplify the received signals; and a transmitter coupled to the amplifier, the transmitter configured to transmit the amplified signals over air, wherein the received signals remain in an analog domain while received, amplified, and transmitted.

12. The relay node of claim 11, wherein the relay comprises:

a demodulator and decoder unit coupled to the receiver, the demodulator and decoder unit configured to demodulate and decode the received signals;

a memory coupled to the demodulator and decoder unit, the memory configured to store the demodulated and decoded signals;

a channel estimation unit coupled to the demodulator and decoder unit, the channel estimation unit configured to estimate a first channel between a source of the received signals and the relay node, and to estimate a second channel between the receiver and the transmitter through the amplifier of the repeater;

a processor coupled to the demodulator and decoder unit, to the memory, and to the channel estimation unit, the processor configured to process control signals present in the demodulated and decoded signals; and a modulator and coder unit coupled to the memory and to the processor, the modulator and coder unit configured to encode and modulate a transmission of a previously demodulated and decoded signals, and to apply a coefficient to the encoded and modulated transmission, the coefficient based on a channel estimate provided by the channel estimation unit.

13. The relay node of claim 12, wherein the relay further comprises the receiver and the transmitter.

14. The relay node of claim 10, wherein the relay comprises:

a demodulator and decoder unit coupled to the receiver, the demodulator and decoder unit configured to demodulate and decode the received signals;

a memory coupled to the demodulator and decoder unit, the memory configured to store the demodulated and decoded signals;

a channel estimation unit coupled to the demodulator and decoder unit, the channel estimation unit configured to estimate a first channel between a source of the received signals and the relay node, and to estimate a second channel between a receiver of the repeater and a transmitter of the repeater and through an amplifier that is coupled to the receiver of the repeater and to the transmitter of the repeater;

a processor coupled to the demodulator and decoder unit, to the memory, and to the channel estimation unit, the processor configured to process control signals present in the demodulated and decoded signals; and a modulator and coder unit coupled to the memory and to the processor, the modulator and coder unit configured to encode and modulate a transmission of a previously demodulated and decoded signals, and to apply a coefficient to the encoded and modulated transmission, the coefficient based on a channel estimate provided by the channel estimation unit.

15. The relay node of claim 14, wherein the demodulated and decoded signals comprise subframes, and wherein the memory is configured to store the subframes.

16. The relay node of claim 10, wherein the relay is configured to receive instructions related to its transmission of the at least a portion of the demodulated and decoded signals that previously were stored while the repeater was transmitting.

17. The relay node of claim 10, further comprising a timer configured to indicate when the repeater is non-transmitting or transmitting.

* * * * *